United States Patent
Sato et al.

(10) Patent No.: US 10,908,473 B2
(45) Date of Patent: Feb. 2, 2021

(54) LIGHT BEAM DIRECTION CONTROLLING DEVICE AND DRIVING METHOD FOR A LIGHT BEAM DIRECTION CONTROL ELEMENT

(71) Applicant: Tianma Japan, Ltd., Kanagawa (JP)

(72) Inventors: Tetsushi Sato, Kawasaki (JP);
Kazunori Masumura, Kawasaki (JP);
Kunihiro Shiota, Kawasaki (JP)

(73) Assignee: TIANMA JAPAN, LTD., Kanagawa ( * ) Notice: Subject to any disclaimer, the term of this patent is extended or adjusted under 35 U.S.C. 154(b) by 238 days.

(21) Appl. No.: 16/215,117

(22) Filed: Dec. 10, 2018

(65) Prior Publication Data
US 2019/0179208 A1 Jun. 13, 2019

(30) Foreign Application Priority Data

Dec. 11, 2017 (JP) .................................. 2017-237002
Aug. 24, 2018 (JP) .................................. 2018-157714

(51) Int. Cl.
G02B 26/08 (2006.01)
G02F 1/29 (2006.01)
G02F 1/167 (2019.01)
G02B 6/08 (2006.01)
G02B 5/00 (2006.01)
G02F 1/1335 (2006.01)
G09G 3/34 (2006.01)

(52) U.S. Cl.
CPC ............. *G02F 1/167* (2013.01); *G02B 5/003* (2013.01); *G02B 6/08* (2013.01); *G02F 1/133524* (2013.01); *G09G 3/34* (2013.01)

(58) Field of Classification Search
CPC .................. G02B 26/00–10; G02B 27/00–648
USPC ........ 359/237–240, 242, 245–246, 250–252, 359/265–271, 290–298; 349/38–40; 345/107
See application file for complete search history.

(56) References Cited

U.S. PATENT DOCUMENTS 6,249,325 B1 * 6/2001 Ohkawara ......... G02F 1/136213
349/38
7,751,667 B2 7/2010 Daniel et al.
(Continued)

FOREIGN PATENT DOCUMENTS

JP 2011-170192 A 9/2011
JP 2011170192 A * 9/2011

*Primary Examiner* — William R Alexander
*Assistant Examiner* — Tamara Y. Washington
(74) *Attorney, Agent, or Firm* — Sughrue Mion, PLLC

(57) ABSTRACT

A light beam direction control device is provided with a transparent substrates in which main surfaces of the transparent substrate are opposed to each other, transparent conductive films respectively disposed on the main surface side of the transparent substrate, electrodes electrically connected to the transparent conductive films, a control circuit for controlling a potential difference between the transparent conductive films and a plurality of light beam transmitting regions arranged on the transparent substrates, light beam absorbing regions disposed between the adjacent light beam transmitting regions, and the transparent conductive films. When shifting the range of outgoing direction of light beam to a narrow state, the control circuit applies the electrodes electrically open and holds the open state.

19 Claims, 38 Drawing Sheets

(56) References Cited

U.S. PATENT DOCUMENTS

| | | | | |
|---|---|---|---|---|
| 2008/0143901 A1* | 6/2008 | Kim | ................. | G09G 3/3655 |
| | | | | 349/38 |
| 2013/0194651 A1* | 8/2013 | Srivastava | ............. | G03H 1/02 |
| | | | | 359/279 |
| 2019/0025571 A1* | 1/2019 | Lee | .................. | G02F 1/1323 |
| 2020/0170087 A1* | 5/2020 | Sato | ................. | H05B 39/042 |

* cited by examiner

45 LOOK UP TABLE

| ELAPSED TIME ET[s] | SECOND VOLTAGE TO BE APPLIED [V] | FIRST VOLTAGE TO BE APPLIED [V] |
| --- | --- | --- |
| 0<ET<30 | 15 | 10 |
| 30<ET<60 | 16 | 11 |
| 60<ET<150 | 20 | 15 |
| 150<ET<300 | 21 | 16 |
| 300<ET<600 | 22 | 17 |
| 600<ET<1500 | 24 | 19 |
| 1500<ET<3000 | 25 | 20 |
| 3000<ET<6000 | 26 | 21 |
| 6000<ET<15000 | 27 | 22 |
| 15000<ET<30000 | 28 | 23 |
| 30000<ET | 30 | 25 |

*FIG. 28*

LIGHT BEAM DIRECTION CONTROLLING DEVICE AND DRIVING METHOD FOR A LIGHT BEAM DIRECTION CONTROL ELEMENT

CROSS-REFERENCE TO RELATED APPLICATIONS

This Non-provisional application claims priority under 35 U.S.C. § 119(a) on Patent Application No. 2017-237002 filed in Japan on Dec. 11, 2017, and Patent Application No. 2018-157714 filed in Japan on Aug. 24, 2018 the entire contents of which are hereby incorporated by reference.

BACKGROUND

This disclosure relates to a light beam direction control device and a driving method for a light beam direction control element.

Flat-panel display devices are used as display devices in various information processing devices such as mobile phones, personal digital assistants (PDAs), automatic teller machines (ATMs), and personal computers.

A commonly known configuration for such flat-panel display devices includes a built-in optical element for adjusting the outgoing direction of the light coming from the backside, a backlight for emitting light uniformly toward the optical element, and a liquid crystal display for displaying an image.

The trend of increase in size and usage of display screens yields demands for various light beam direction characteristics to the flat-panel display devices.

Particularly from the viewpoint of information leakage, there is a demand to limit the viewable range to prevent peeking or a demand not to provide light in unnecessary directions. As an optical element meeting this demand, an optical film capable of limiting the viewable range of the display (or the outgoing range of light) has been proposed and commercialized.

The flat-panel display device with this optical film requires removing the optical film each time when people want to see the display from multiple directions together. Because of such bothersome operations and waste of time for the user, there is an increasing demand to achieve a wide viewable range state and a narrow viewable range state at desired times without a bothersome operation of removing the film.

To meet this demand, an optical element capable of switching the viewable range of the display between a wide viewing angle mode and a narrow viewing angle mode has been proposed (for example, U.S. Pat. No. 7,751,667 B).

U.S. Pat. No. 7,751,667 B discloses a light beam direction control element which includes light transmissive regions and electrophoretic elements for controlling the direction of light provided on a transparent substrate and controls the viewing angle of the light transmitted through the light transmissive regions. According to U.S. Pat. No. 7,751,667 B, transparent electrodes are provided on both ends of each electrophoretic element in which liquid including colored charged particles is encapsulated. To achieve a wide viewing angle state, a direct voltage is applied across the transparent electrodes to move the colored charged particles. To achieve a narrow viewing angle state, an alternating voltage is applied across the transparent electrodes to disperse the colored charged particles within the electrophoretic elements.

JP 2011-170192 A is a known art for controlling an electrophoretic element. JP 2011-170192 A discloses a technique to improve the performance in holding an image on an electrophoretic device including electrophoretic elements: after the screen has been changed to a state of displaying in the color of electrophoretic particles, one of the two electrodes is changed to a high-impedance state.

SUMMARY

The aforementioned U.S. Pat. No. 7,751,667 B can control the viewing angle with electrophoretic elements; however, it does not disclose a detailed driving method to switch a wide viewing angle state and a narrow viewing angle state. Accordingly, it is difficult to reduce the transition time between the wide viewing angle state and the narrow viewing angle state. Further, voltage application is necessary in both of the wide viewing angle state and the narrow viewing angle state and therefore, it is difficult to achieve low power consumption. JP 2011-170192 A is about a technique to use electrophoretic elements as a display device and does not disclose or suggest switching a wide viewing angle state and a narrow viewing angle state or achieving low power consumption.

In view of the above, this disclosure provides a light beam direction control device and a driving method for a light beam direction control element to achieve quick switching between a wide viewing angle state and a narrow viewing angle state with an electrophoretic element and low power consumption.

An aspect of the present disclosure adopts the following constitutions to solve the above problems. A light beam direction control device includes: a first transparent substrate and a second transparent substrate disposed in such a manner that a main face of the first transparent substrate and a main face the second transparent substrate are opposed to each other; a first transparent conductive film and a second transparent conductive film provided on the main face of the first transparent substrate and the main face of the second transparent substrate, respectively; a first electrode and a second electrode electrically connected with the first transparent conductive film and the second transparent conductive film, respectively; a plurality of light beam transmissive regions disposed on the first transparent substrate and the second transparent substrate; light beam absorbing regions each disposed between light beam transmissive regions adjacent to each other and including light beam blocking electrophoretic particles and transmissive dispersion medium, the electrophoretic particles having charges of a specific polarity; and a control circuit configured to control potential difference between the first transparent conductive film and the second transparent conductive film, the control circuit is configured to: change a dispersion state of the electrophoretic particles by adjusting the potential difference to change a range of outgoing direction of light beam that passes through the light beam transmissive regions and the dispersion medium; and apply a predetermined voltage across the first electrode and the second electrode to change the range of outgoing direction to a wide range, electrically open-circuit the first electrode and the second electrode to change the range of outgoing direction to a narrow range, and keep the open-circuited state to maintain the narrow range of outgoing direction.

It is to be understood that both the foregoing general description and the following detailed description are exemplary and explanatory and are not restrictive of this disclosure.

BRIEF DESCRIPTION OF THE DRAWINGS

FIG. 28 is a diagram illustrating an example of the LUT according to the ninth embodiment.

DETAILED DESCRIPTION OF THE EMBODIMENTS

Hereinafter, embodiments of this disclosure are described with reference to the accompanying drawings. It should be noted that the embodiments are merely examples to implement this disclosure and not to limit the technical scope of this disclosure. Elements common to drawings are assigned the same reference signs.

First Embodiment

Figure 1:
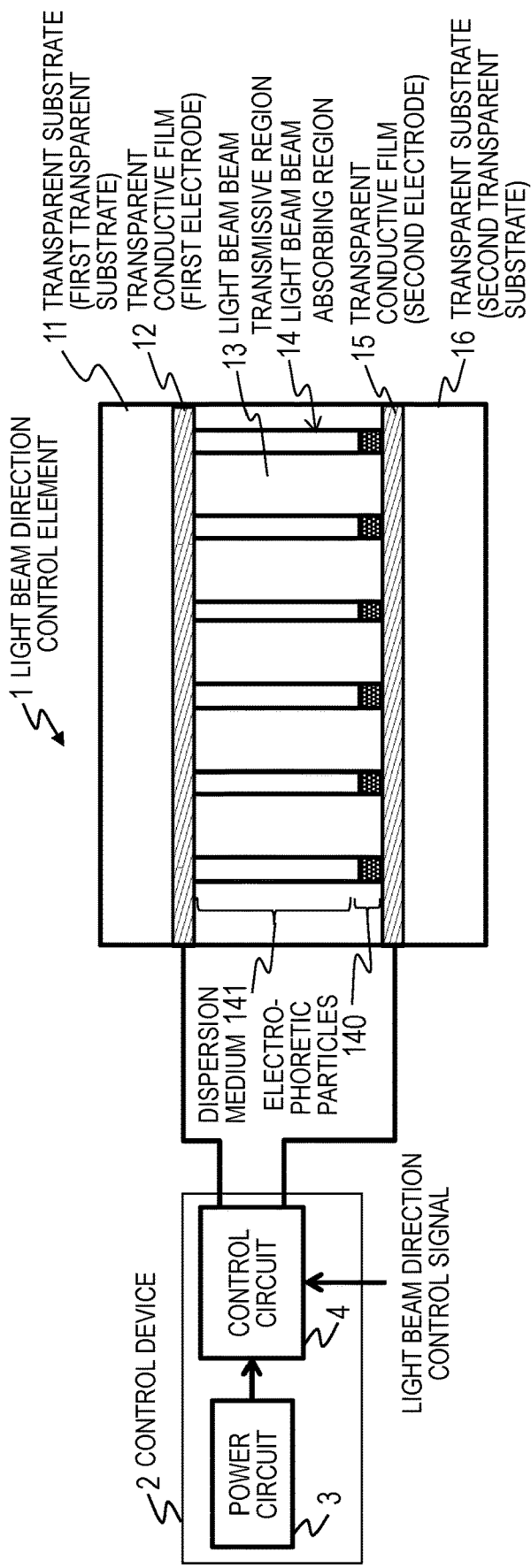
FIG. 1 is a block diagram illustrating an example of a light beam direction control device according to a first embodiment.

FIG. 1 is a block diagram illustrating an example of a light beam direction control device in the first embodiment.

The light beam direction control device includes a light beam direction control element 1 for controlling the viewing angle and a control device 2. The light beam direction control element 1 includes a transparent conductive film (first electrode) 12 and another transparent conductive film (second electrode) 15.

The control device 2 includes a power circuit 3 and a control circuit 4. The control circuit 4 receives a light beam direction control signal from a host control device (not illustrated). The control circuit 4 receives power from the power circuit 3 and controls the voltage to be applied across the transparent conductive film (first electrode) 12 and the transparent conductive film (second electrode) 15 or connection between these films, based on the light beam direction control signal.

FIG. 1 also illustrates an example of the cross-sectional structure of the light beam direction control element 1. The transparent conductive film (first electrode) 12 is on the main face of a transparent substrate (first substrate) 11 and the transparent conductive film (second electrode) 15 is on the main face of a transparent substrate (second transparent substrate) 16. The transparent substrate 11 and the transparent substrate 16 are disposed in such a manner that their main faces are opposed to each other.

Between the transparent conductive film 12 and the transparent conductive film 15 opposed to each other, light beam transmissive regions 13 and light beam absorbing regions 14 are disposed alternately.

Figure 2:
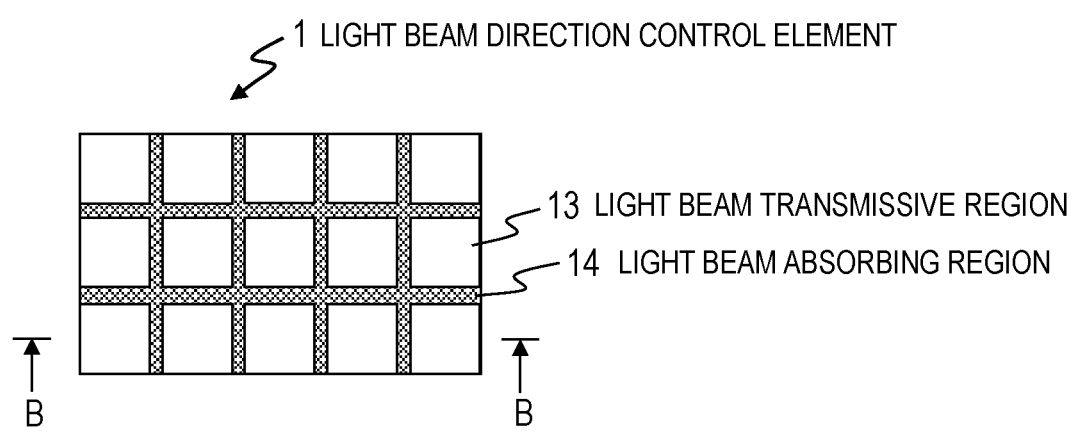
FIG. 2 is an example of a plan view of the light beam transmissive regions 13 and the light beam absorbing regions 14 when seen in the direction normal to the main face of the light beam direction control element according to the first embodiment.

FIG. 2 is an example of a top view (plan view) of the light beam transmissive regions 13 and the light beam absorbing regions 14 when seen in the direction normal to the main face (transparent substrate 11) of the light beam direction control element 1 in the first embodiment. Rectangular light beam transmissive regions 13 are disposed at predetermined intervals in the vertical direction and the horizontal direction of the drawing. Light beam absorbing regions 14 are provided between light beam transmissive regions 13 adjacent to each other.

The planar shapes of the light beam transmissive regions 13 and the light beam absorbing regions 14 are not limited to the examples in FIG. 2; any desired shapes can be employed. As to the planar disposition of the light beam absorbing regions 14, not only the grid-like disposition in FIG. 2 to control the vertical viewing angle and the horizontal viewing angle but a vertical stripe disposition or a horizontal stripe disposition can be employed to provide a light beam direction control element 1 for controlling only the horizontal viewing angle or only the vertical viewing angle, respectively. For example, the reflection of a vehicular indicator onto the windshield can be controlled by controlling the vertical viewing angle.

A light beam transmissive region 13 is made of a transparent material (for example, resin) that transmits light beam. The preferable height is within the range from 3 μm to 300 μm and the first embodiment employs the height of 60 μm. The preferable width of a light beam transmissive region 13 (light beam transmission pattern width) is within the range from 1 μm to 150 μm and the first embodiment employs the width of 20 μm. Furthermore, the preferable width between light beam transmissive regions 13 (light beam blocking pattern width) is within the range from 0.25 μm to 40 μm and the first embodiment employs the width of 5 μm.

An electrophoretic element is encapsulated in a light beam absorbing region 14. The electrophoretic element is a mixture of light beam blocking electrophoretic particles 140 (colored charged particles) having charges of a specific polarity and dispersion medium 141. To achieve a light beam blocking function, the electrophoretic particles 140 are preferably colored in black to absorb light beam. For example, the electrophoretic particles 140 are charged microparticles of carbon black. The example described in the following employs negatively charged carbon black microparticles. The dispersion medium 141 is preferably transparent to transmit light beam and has a refractive index substantially the same as the refractive index of the transparent material of the light beam transmissive regions 13 to minimize the interfacial reflection with the light beam transmissive regions 13.

Figure 3A:
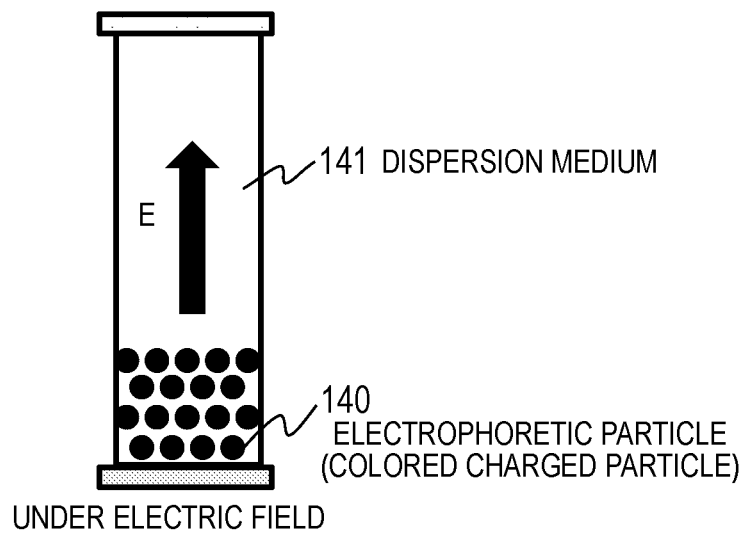
FIG. 3A is a diagram illustrating an example of the distribution state of electrophoretic particles in the presence of an electric field according to the first embodiment.
Figure 3B:
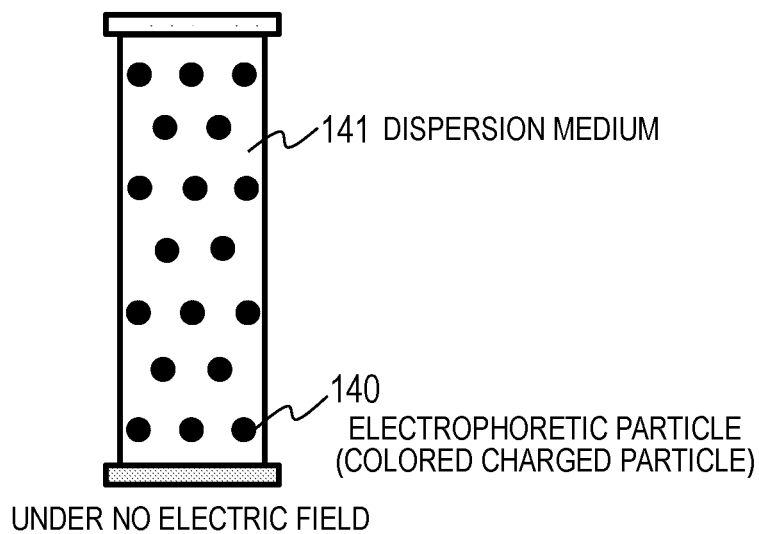
FIG. 3B is a diagram illustrating an example of the distribution state of electrophoretic particles in the absence of an electric field according to the first embodiment.

The electrophoretic element in this embodiment is designed so that the repulsion generated by electric charge is higher than the attraction between charged particles. For this reason, when an electric field exists, the negatively charged electrophoretic particles 140 gather to the electrode having a higher potential, as schematically illustrated in FIG. 3A. When no electric field exists, the most stable state of the electrophoretic particles 140 is a state where the electrophoretic particles 140 are dispersed in a macroscopically uniform density because of the repulsion on one another, as schematically illustrated in FIG. 3B.

The light beam direction control device configured as described above enables switch between a wide viewing angle state and a narrow viewing angle state. First, the stable states of the wide viewing angle state and the narrow viewing angle state are described and subsequently, transient response in switching the wide viewing angle state and the narrow viewing angle state are described.

Figure 4A:
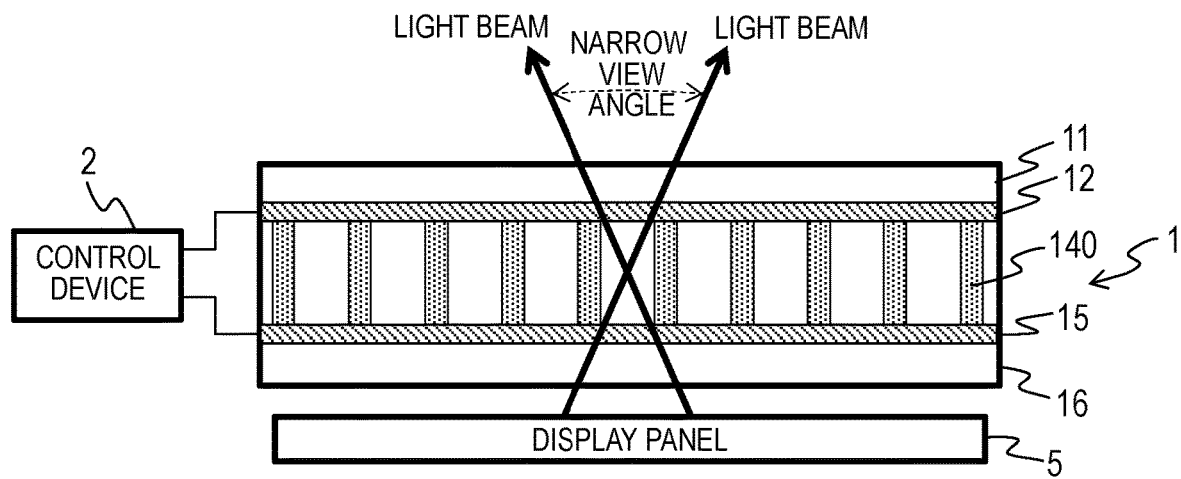
FIG. 4A is a cross-sectional view illustrating a light beam angle that can be emitted from a light beam direction control element in a narrow viewing angle state according to the first embodiment.
Figure 4B:
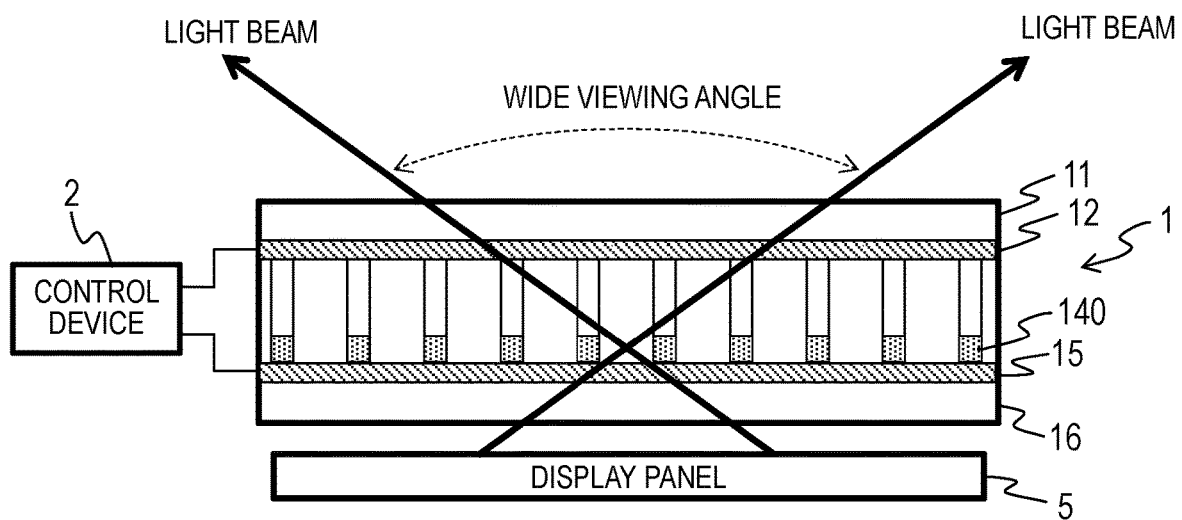
FIG. 4B is a cross-sectional view illustrating a light beam angle that can be emitted from a light beam direction control element in a wide viewing angle state according to the first embodiment.

FIGS. 4A and 4B are schematic diagrams illustrating states when an image having a wide viewing angle displayed on a display panel 5 disposed behind the light beam direction control element 1 in the first embodiment is observed through the light beam direction control element 1. The light beam direction control element 1 may be disposed in front of a planar light source. In a display device including a backlight like a liquid crystal display device, the light beam direction control element 1 may be disposed between the liquid crystal display panel and the backlight.

FIG. 4A illustrates a narrow viewing angle state; the electrophoretic particles 140 are uniformly dispersed in the dispersion medium 141. FIG. 4B illustrates a wide viewing angle state; the electrophoretic particles 140 are gathered in the proximity of one transparent conductive film (second electrode) 15. The control device 2 changes the distribution of the electrophoretic particles 140 in the light beam direction control element 1 to switch the viewing angle that allows observation of the display image between a narrow viewing angle state and a wide viewing angle state.

Figure 5A:
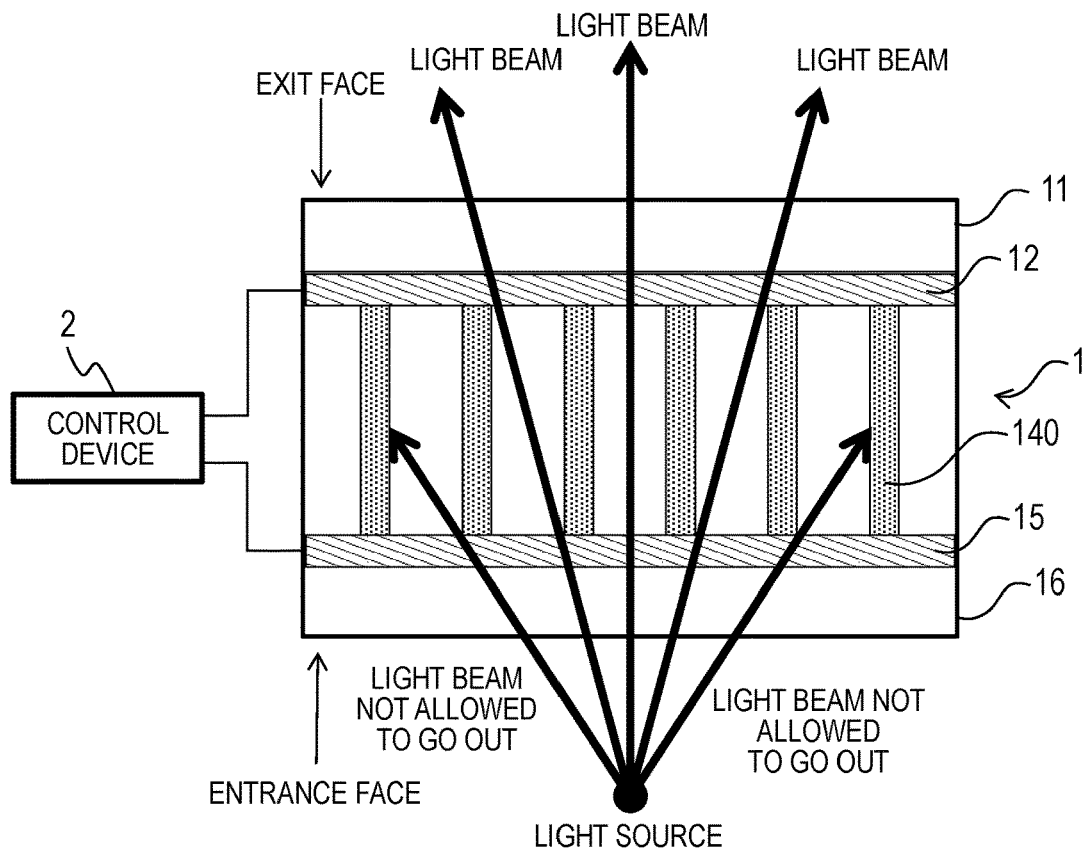
FIG. 5A is a cross-sectional diagram illustrating the angle of light beam allowed to go out from the exit face of the light beam direction control element in a narrow viewing angle state according to the first embodiment.
Figure 5B:
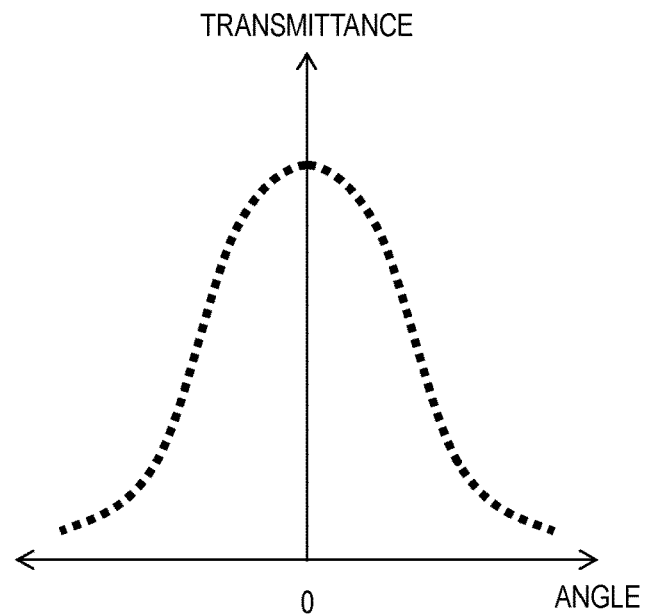
FIG. 5B is a diagram illustrating the relation between the angle of outgoing light beam and the transmittance in a narrow viewing angle state according to the first embodiment.

The viewing angle control performed by the control device 2 is described more specifically. FIG. 5A is a cross-sectional diagram illustrating the angle of light beam allowed to go out from the exit face of the light beam direction control element 1 in a narrow viewing angle state and FIG. 5B is a diagram illustrating the relation between the angle of outgoing light beam and the transmittance. In a narrow viewing angle state, the control device 2 short-circuits or open-circuits the transparent conductive film (first electrode) 12 and the transparent conductive film (second electrode) 15 not to apply an electric field to the electrophoretic elements.

As a result, the electrophoretic particles 140 become completely dispersed in the light beam absorbing regions 14. Since the electrophoretic particles 140 are black-colored to have a light beam blocking property, the light beam that hits the electrophoretic particles 140 in the light beam that comes from the entrance face of the light beam direction control element 1 is absorbed and does not go out from the light beam direction control element 1. Accordingly, the transmittance with respect to the angle of outgoing light beam is as indicated in FIG. 5B.

Figure 6A:
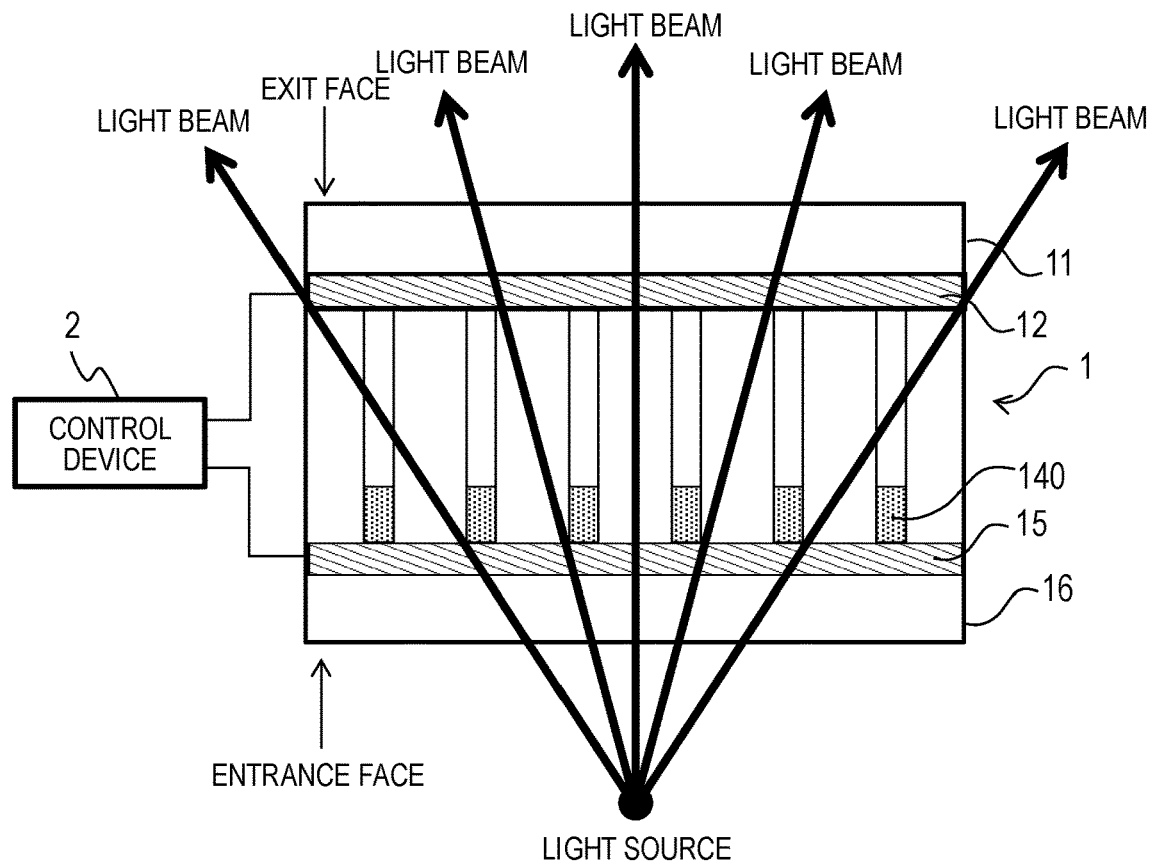
FIG. 6A is a cross-sectional diagram illustrating the angle of light beam allowed to go out from the exit face of the light beam direction control element in a wide viewing angle state according to the first embodiment.
Figure 6B:
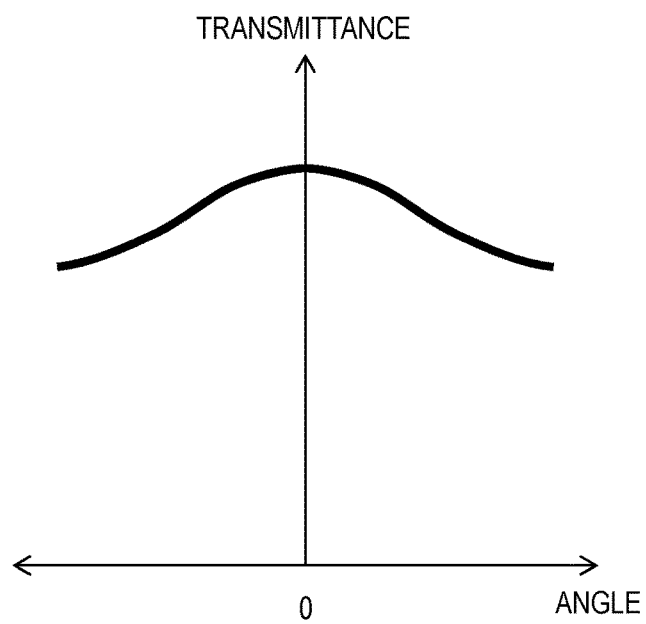
FIG. 6B is a diagram illustrating the relation between the angle of outgoing light beam and the transmittance in a wide viewing angle state according to the first embodiment.

FIG. 6A is a cross-sectional diagram illustrating the angle of light beam allowed to go out from the exit face of the light beam direction control element 1 in a wide viewing angle state and FIG. 6B is a diagram illustrating the relation between the angle of outgoing light beam and the transmittance. In a wide viewing angle state, the control device 2 apply a potential difference (voltage) across the transparent conductive film (first electrode) 12 and the transparent conductive film (second electrode) 15 to apply an electric field to the electrophoretic elements.

In response to application of a voltage such that the transparent conductive film (second electrode) 15 will have a potential higher than the potential of the transparent conductive film (first electrode) 12, the negatively charged electrophoretic particles 140 are collected to the proximity of the transparent conductive film (second electrode) 15.

Accordingly, as illustrated in FIG. 6A, the light beam that hits the electrophoretic particles 140 in the light beam that comes from the entrance face is a little, compared to the case of FIG. 5A. Since the dispersion medium 141 is transparent as described above, the incident light beam at an angle that is blocked in the narrow viewing angle state passes through the light beam direction control element 1. Accordingly, the transmittance with respect to the angle of outgoing light beam is as indicated in FIG. 6B.

The electrophoretic particles 140 in the light beam absorbing regions 14 in FIG. 6A are collected around the transparent conductive film 15; however, the electrophoretic particles 140 may be collected around the transparent conductive film 12. A wide viewing angle state can be achieved by collecting the electrophoretic particles 140 to the transparent conductive film 12.

Next, transient response in switching a wide viewing angle state and a narrow viewing angle state are described.

Figure 7A:
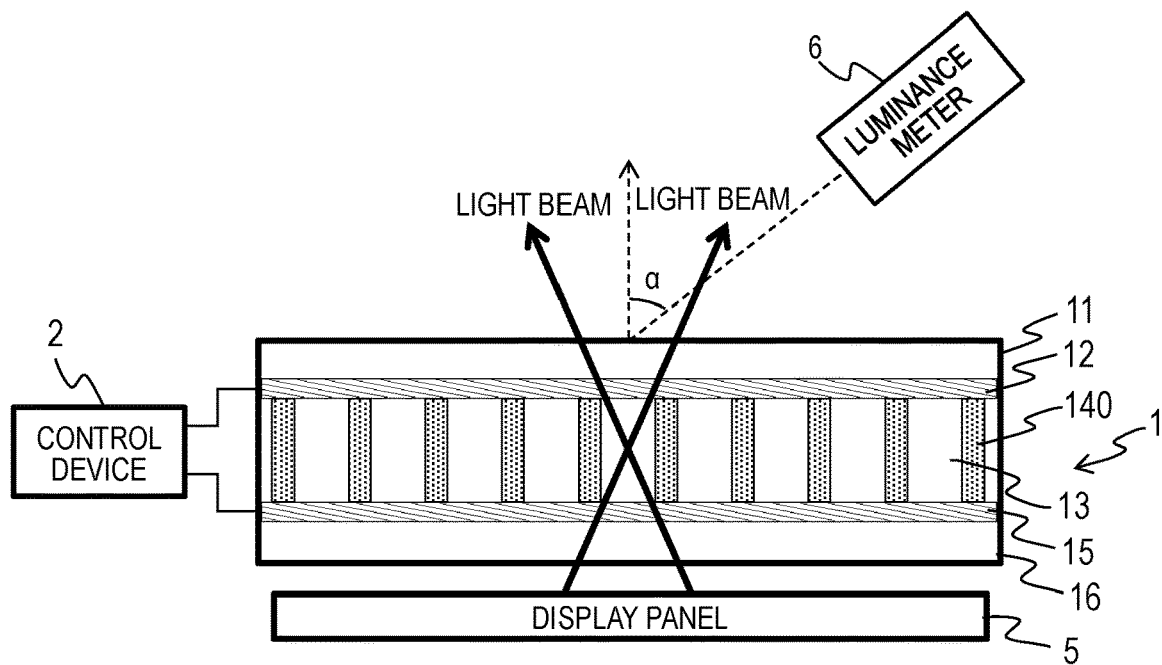
FIG. 7A schematically illustrates the measurement in a narrow viewing angle state according to the first embodiment.
Figure 7B:
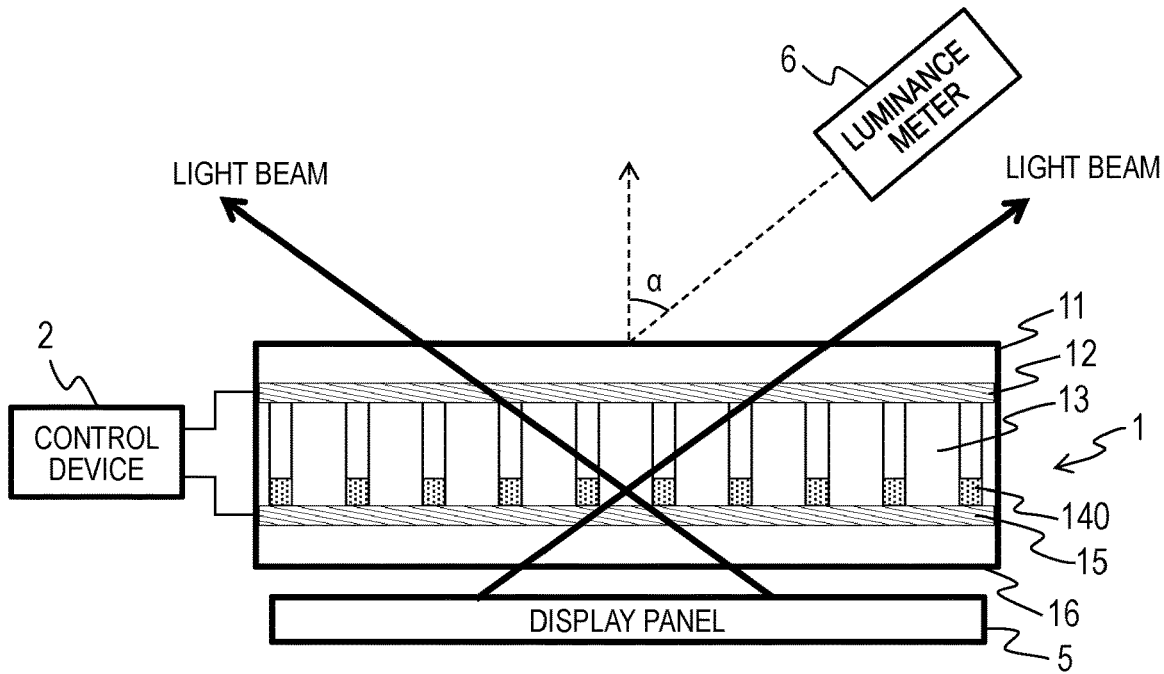
FIG. 7B schematically illustrates the measurement in a wide viewing angle state according to the first embodiment.

As illustrated in FIGS. 7A and 7B, the luminance of the light transmitted through the light beam direction control element 1 at a specified angle α was measured with a luminance meter 6 in a narrow viewing angle state and in a wide viewing angle state. FIG. 7A schematically illustrates the measurement in a narrow viewing angle state and FIG. 7B schematically illustrates the measurement in a wide viewing angle state. The luminance meter 6 was set at a specified distance from the front face (exit face) of the transparent substrate 11 to have an angle α with respect to the normal to the main face of the transparent substrate 11. The specified angle α is 55 degrees, for example.

Figure 7C:
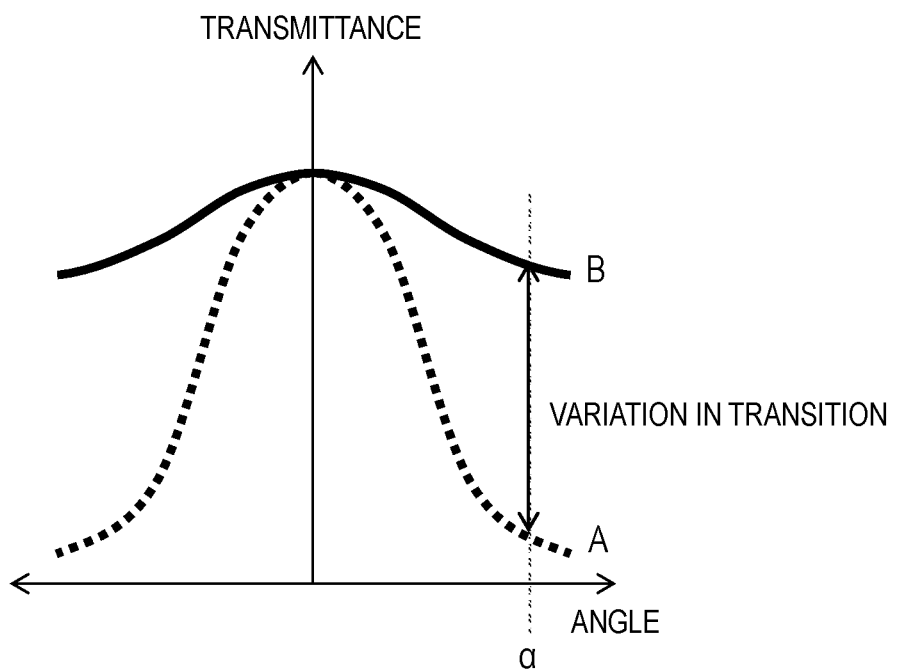
FIG. 7C is a graph illustrating the relationship between light beam angle and transmittance that can be emitted from the light direction control element in the wide viewing angle state and the narrow viewing angle state according to the first embodiment.

Furthermore, the transmittance was calculated and the transient response in transmittance during the transition from a narrow viewing angle state to a wide viewing angle state or from a wide viewing angle state to a narrow viewing angle state was evaluated. This corresponds to the transient response between the transmittance A in the narrow viewing angle state and the transmittance B in the wide viewing angle state at the angle α in the graph of FIG. 7C.

The transmittance of the light beam direction control element 1 can be expressed by the following formula:

$$\text{Transmittance} = Y/Y\text{base},$$

where Ybase represents the luminance of white light beam of the light source itself (when the light beam direction control element 1 is removed from the configuration in FIGS. 7A and 7B) and Y represents the value measured by the luminance meter 6.

First, switching from a wide viewing angle state to a narrow viewing angle state is described. In measuring the transmittance, the light beam direction control element 1 utilizing electrophoretic particles 140 designed as described with reference to FIGS. 3A and 3B was used. The transient response in transmittance was measured when the transparent conductive film (first electrode) 12 and the transparent conductive film (second electrode) 15 provided with a potential difference (in a wide viewing angle state) were short-circuited and when these conductive films 12 and 15 were open-circuited.

Figure 8:
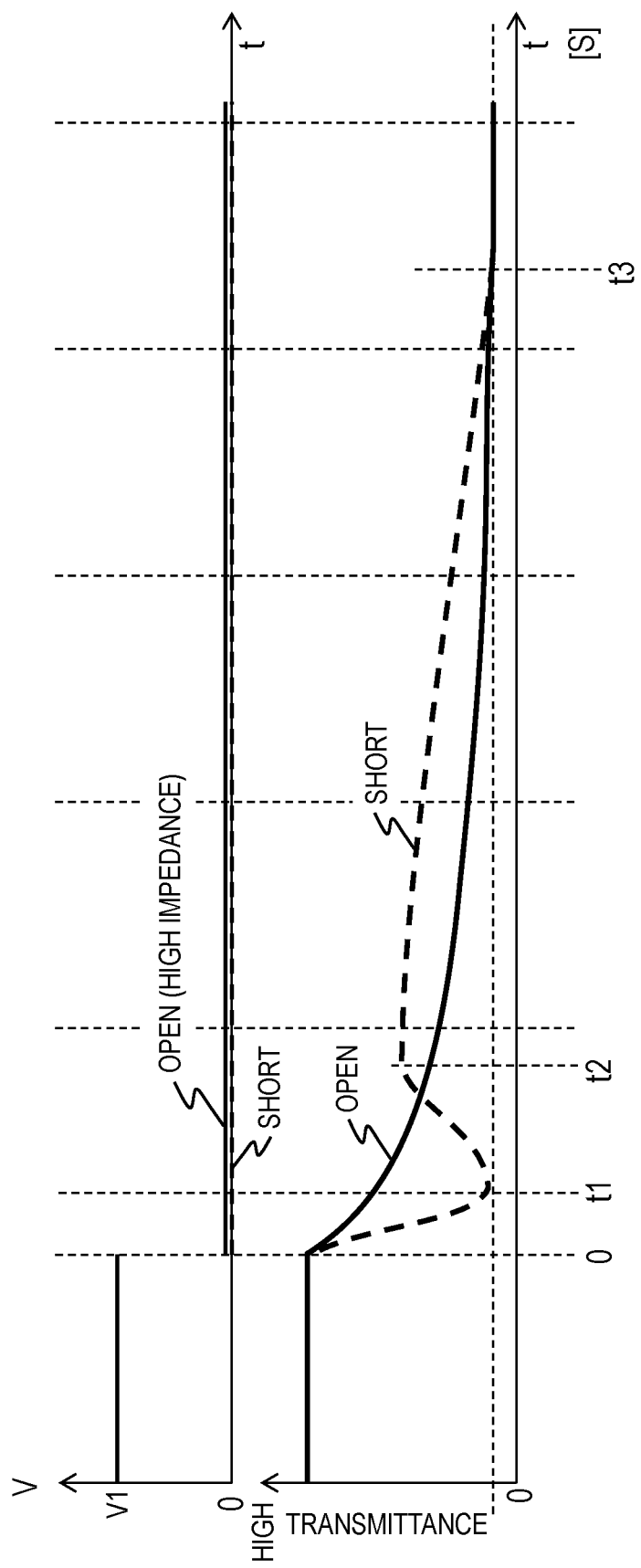
FIG. 8 is a graph indicating the result of measuring the transient change of the transmittance at the angle α measured in FIG. 7A corresponding to the change in the voltage applied to the light beam direction control element according to the first embodiment.

FIG. 8 provides measurement results of transient response, specifically, graphs representing temporal variation in voltage applied to the light beam direction control element 1 and graphs representing temporal variation in transmittance. In FIG. 8, the time to switch from applying a predetermined voltage (first voltage) V1 to short-circuiting or open-circuiting the transparent conductive films 12 and 15 is defined as time 0.

The two dashed lines from the time 0 in the graphs in FIG. 8 represent temporal variation in voltage and transmittance in the case where the transparent conductive films 12 and 15 are short-circuited. The two solid lines represent temporal variation in voltage and transmittance in the case where the transparent conductive films 12 and 15 are electrically separated to be open-circuited (at high impedance).

As indicated in FIG. 8, it was revealed that the transient response in transmittance is significantly different between the cases of short-circuit and open-circuit. Specifically, when the transparent conductive films 12 and 15 are short-circuited, the transmittance (broken line) drastically decreases until time t1, faster than the case of open-circuit. After the time t1, however, the transmittance turns upward, reaches a specific value at time t2, and then gradually decreases. The transmittance reaches a specific value at time t3 and a narrow viewing angle state is stabilized. It was revealed that, in the case of short-circuit, the transmittance decreases to the minimum value, increases thereafter, and decreases again.

In the other case where the transparent conductive films 12 and 15 are open-circuited, the transmittance gradually decreases without indicating a minimum value like the case of short-circuit, reaches a specific value at the time t3, and a narrow viewing angle state is stabilized.

As indicated in FIG. 8, the light beam direction control device employing a driving method utilizing short-circuit has large decrease in transmittance until the time t1, compared to the light beam direction control device employing a driving method utilizing open-circuit; accordingly, peeking protection is attained quickly. However, the transmittance increases again after the time t1, so that the displayed image might be seen faintly to allow peeking even at the angle where the protection is intended.

For this reason, in the first embodiment, the control circuit 4 open-circuits the transparent conductive films 12 and 15 in changing the light beam direction control element 1 from a wide viewing angle state to a narrow viewing angle state. This operation eliminates the rebound such that the once lowered transmittance increases again, achieving smooth transition from a wide viewing angle state to a narrow viewing angle state.

Figure 9:
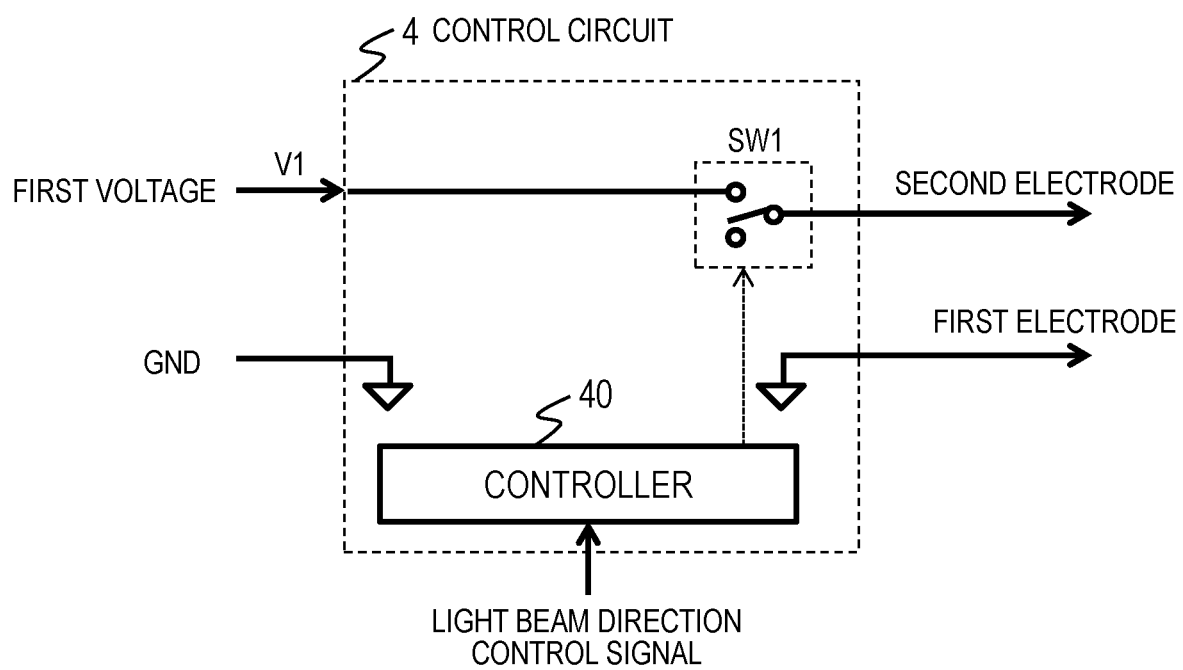
FIG. 9 is a block diagram illustrating an example of the control circuit 4 according to the first embodiment.

FIG. 9 is a block diagram illustrating an example of the control circuit 4 in the first embodiment. The control circuit 4 includes a switch SW1 and a controller 40. The controller 40 includes a processor, a memory, and an interface which are not illustrated in FIG. 9 to control the switch SW1 in response to a light beam direction control signal.

The control circuit 4 controls the connection of the voltage (first voltage) V1 of the power circuit 3 to the transparent conductive film (second electrode) 15. Since the control circuit 4 grounds the transparent conductive film (first electrode) 12, when the control circuit 4 connects the voltage V1 to the transparent conductive film (second electrode) 15, the voltage V1 is applied across the transparent conductive films 12 and 15. When the control circuit 4 disconnects the voltage V1 from the transparent conductive film (second electrode) 15, the transparent conductive film (second electrode) 15 becomes an electrically floating state. Accordingly, the transparent conductive films 12 and 15 are open-circuited.

Upon receipt of a light beam direction control signal (wide viewing angle signal) requesting a wide viewing angle state from the external, the controller 40 in the control circuit 4 controls the switch SW1 to apply the voltage V1 to the transparent conductive film (second electrode) 15. As a result, the voltage V1 is applied across the transparent conductive films 12 and 15 and the electrophoretic particles 140 gather toward the transparent conductive film 15 of the second electrode. Accordingly, the light beam direction control element 1 becomes a wide viewing angle state.

Upon receipt of a light beam direction control signal (narrow viewing angle signal) requesting a narrow viewing angle state from the external, the controller 40 in the control circuit 4 controls the switch SW1 to disconnect the voltage V1 from the transparent conductive film (second electrode) 15. The transparent conductive films 12 and 15 becomes open-circuited and the electrophoretic particles 140 start dispersing spontaneously because of their own charges. As a result, the light beam direction control element 1 becomes a narrow viewing angle state after a while.

As set forth above, the first embodiment open-circuits the transparent conductive films 12 and 15 to change the light beam direction control element 1 from a wide viewing angle state to a narrow viewing angle state. This configuration achieves gradual and smooth decrease in transmittance into a narrow viewing angle state. Since the power is not necessary in the narrow viewing angle state, the light beam direction control element 1 can save the power consumption.

It should be noted that the block diagram in FIG. 9 is an example; any circuit configuration is employable as far as the configuration can switch a state where a predetermined voltage V1 is applied across the transparent conductive film (first electrode) 12 and the transparent conductive film (second electrode) 15 and a state where the transparent conductive films 12 and 15 are electrically open-circuited. For example, the switch SW1 may be connected with the transparent conductive film (first electrode) 12. In another example, another switch connected with the transparent conductive film (first electrode) 12 may be provided in addition to the switch SW1 connected with the transparent conductive film (second electrode) 15.

Second Embodiment

Figure 10:
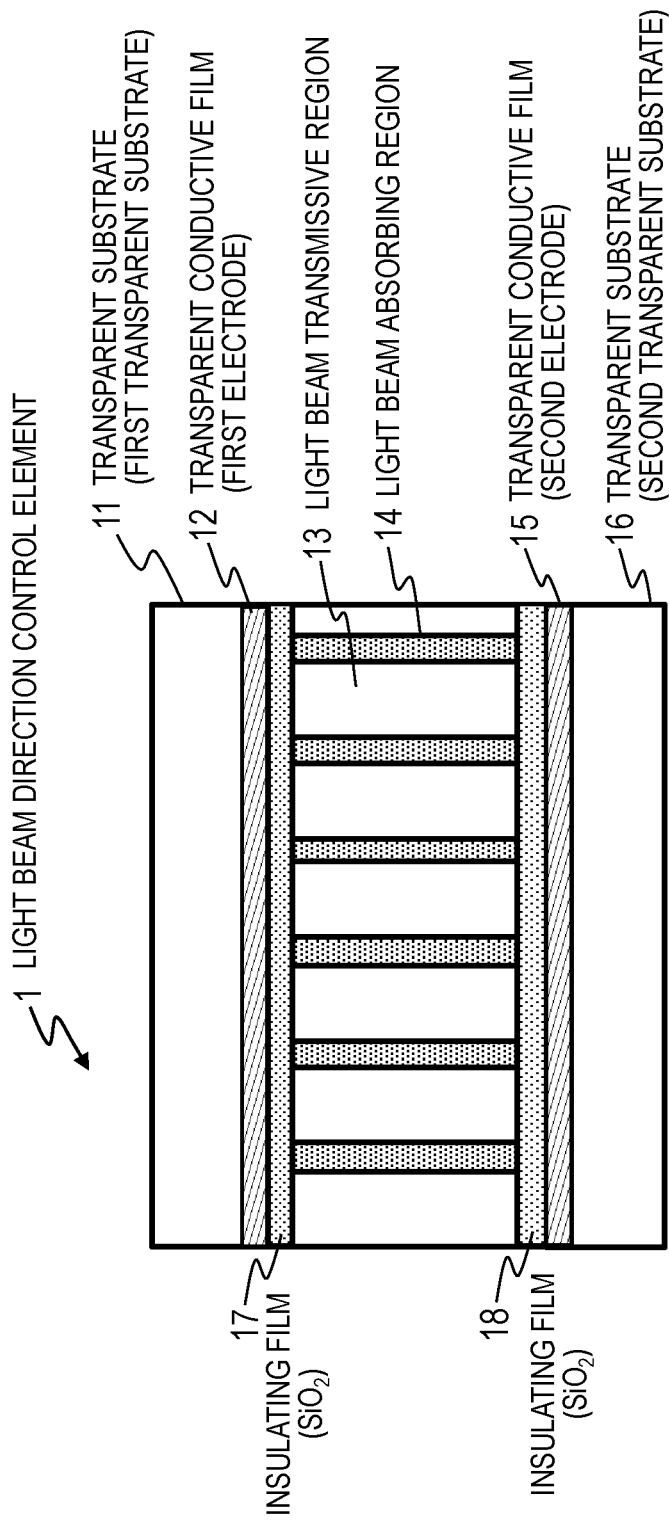
FIG. 10 is a cross-sectional diagram of a light beam direction control element according to a second embodiment.

FIG. 10 is a cross-sectional diagram of a light beam direction control element 1 in the second embodiment. The light beam direction control element 1 in the second embodiment includes insulating films 17 and 18 covering the transparent conductive films 12 and 15, in addition to the configuration of the first embodiment illustrated in FIG. 1. The remaining configuration is the same as the configuration of the first embodiment.

A transparent insulating film 17 is provided between the transparent conductive film (first electrode) 12 and the layer of the light beam transmissive regions 13 and the light beam absorbing regions 14. A transparent insulating film 18 is provided between the transparent conductive film (second electrode) 15 and the layer of the light beam transmissive regions 13 and the light beam absorbing regions 14. The insulating films 17 and 18 can be made of $SiO_2$, for example. In other words, between each of the main faces of the transparent substrates 11 and 16 opposed to each other and a light beam absorbing region 14, the insulating film 17 or 18 is provided.

Although FIG. 10 provides an example where the transparent insulating films 17 and 18 are made of $SiO_2$, the material of the insulating film s is not limited to this. The insulating films 17 and 18 can be made of any other transparent insulating material.

As a modification, the insulating films 17 and 18 can be provided only between the transparent conductive film (first electrode) 12 on the main face of the transparent substrate 11 and the light beam absorbing regions 14 and only between the transparent conductive film (second electrode) 15 on the main face of the transparent substrate 15 and the light beam absorbing regions 14; they do not need to be provided between the transparent conductive film (first electrode) 12 and the light beam transmissive regions 13 and between the transparent conductive film (second electrode) 15 and the light beam transmissive regions 13.

The second embodiment prevents electrophoretic particles 140 from sticking to the transparent conductive film 12 or 15 by interposing the insulating films 17 and 18 between the transparent conductive film 12 and the light beam absorbing regions 14 and between the transparent conductive film 15 and the light beam absorbing regions 14. The sticking of electrophoretic particles 140 to the transparent conductive film 12 or 18 can be caused by long-time high density of electrophoretic particles 140 in the proximity of the transparent electrode. This configuration of the second embodiment achieves more stable transition characteristics between the wide viewing angle state and the narrow viewing angle state.

Third Embodiment

Figure 11:
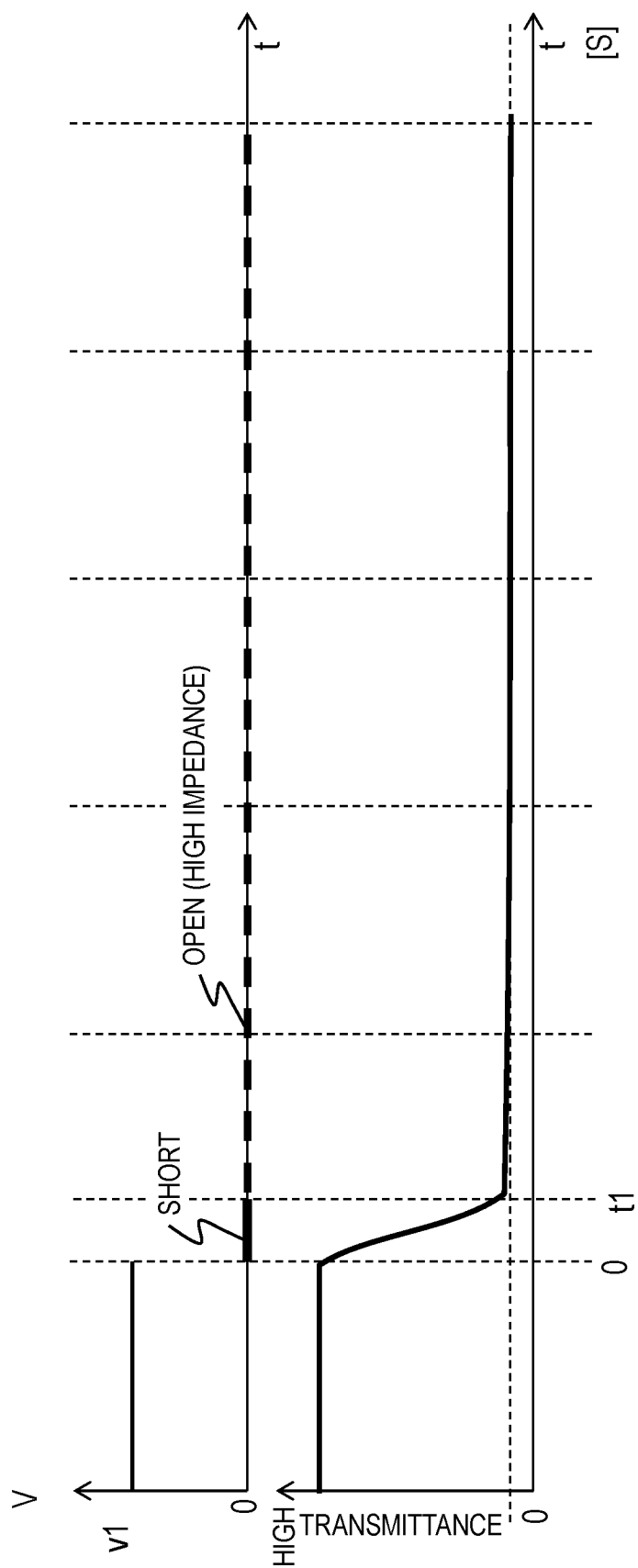
FIG. 11 is a graph indicating the result of measuring the transient change of the transmittance at the angle α measured in FIG. 7A corresponding to the change in the voltage applied to the light beam direction control element according to a third embodiment.
Figure 12:
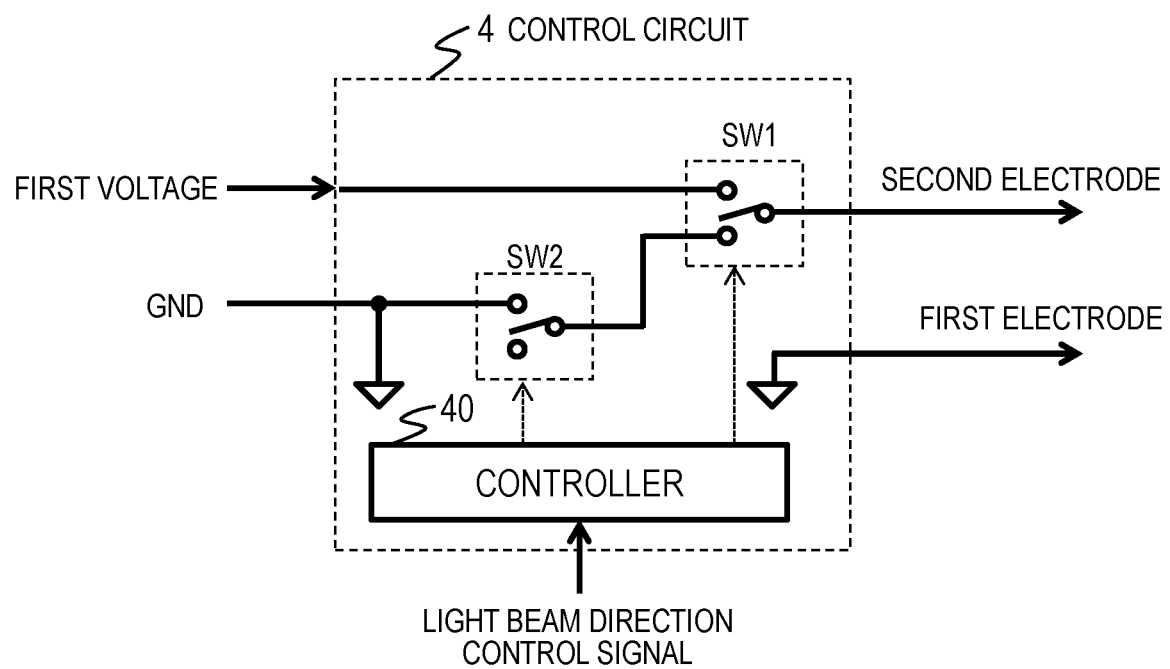
FIG. 12 is a block diagram illustrating an example of the configuration of the control circuit according to the third embodiment.
Figure 13:
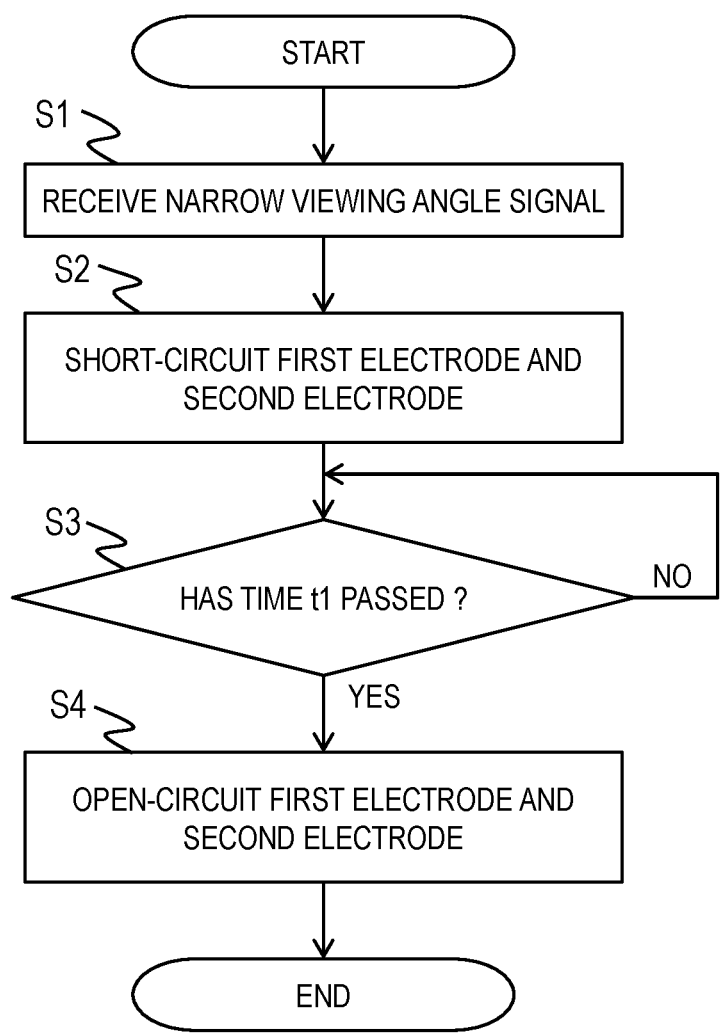
FIG. 13 is a flowchart an example of control processing in response to a narrow viewing angle signal according to the third embodiment.

FIGS. 11 to 13 illustrate the third embodiment. The third embodiment once short-circuits and then open-circuits the transparent conductive film (first electrode) 12 and the transparent conductive film (second electrode) 15 in changing the light beam direction control element 1 from a wide viewing angle state to a narrow viewing angle state.

As indicated in FIG. 8 in the first embodiment, short-circuiting the transparent conductive films 12 and 15 can decrease the transmittance in shorter time than open-circuiting in changing the light beam direction control element 1 from a wide viewing angle state to a narrow viewing angle state. However, in the case where the control circuit 4 short-circuits the transparent conductive films 12 and 15, the transmittance increases after decreasing. Accordingly, the transition to the narrow viewing angle state does not proceed smoothly and also, the peeking protection effect is impaired after the transmittance increases.

To address this issue, the inventors found that change from a wide viewing angle state to a narrow viewing angle state in short transition time is available by short-circuiting the transparent conductive films 12 and 15 for a specific time (temporarily) and open-circuiting thereafter as will be described later with reference to FIG. 11 in the third embodiment.

FIG. 11 provides a graph representing a result of measurement of transient response in transmittance at the angle α in FIGS. 7A and 7B in response to change of the voltage applied to the light beam direction control element 1 in accordance with the third embodiment. Specifically, FIG. 11 includes a graph representing the temporal variation in voltage applied to the light beam direction control element 1 and a graph representing the temporal variation in transmittance. Like in FIG. 8, the time to switch from applying the predetermined voltage V1 to short-circuiting the transparent conductive films 12 and 15 is defined as time 0.

The solid line from the time 0 to time t1 in the graph of the temporal variation in voltage represents the applied voltage in the period while the transparent conductive films 12 and 15 are short-circuited. The broken line from the time t1 represents the applied voltage in the period while the transparent conductive films 12 and 15 are electrically separated and open-circuited (at high impedance).

As indicated in FIG. 11, in the period (from 0 to t1) while the transparent conductive films 12 and 15 are short-circuited, the transmittance decreases faster than in the case of open-circuit, like in the case of short-circuit in FIG. 8. In the measurement, the connection between the transparent conductive films 12 and 15 was changed from short-circuit to open-circuit at the time t1 when the transmittance under short-circuit takes the minimum value in FIG. 8.

After the time t1 at which the connection between the transparent conductive films 12 and 15 was changed to open-circuit, the transmittance gradually and gently decreased without increasing. That is to say, it was revealed that the change of connection between the transparent conductive films 12 and 15 in the third embodiment does not increase the transmittance after reaching the minimum value, unlike the case of short-circuit in FIG. 8 and further, achieves stabilization of the narrow viewing angle state faster than the case of open-circuit in FIG. 8.

FIG. 12 is a block diagram illustrating an example of the configuration of the control circuit 4 in the third embodiment. The light beam direction control device in the third embodiment includes a light beam direction control element 1 and a control device 2 as illustrated in FIG. 1. The description of the configuration other than the configuration of the control circuit 4 is omitted. The light beam direction control element 1 can have the configuration of the light beam direction control element in the second embodiment illustrated in FIG. 10.

As illustrated in FIG. 12, the control circuit 4 in the third embodiment includes a switch SW1, another switch SW2, and a controller 40. The controller 40 includes a processor, a memory, and an interface which are not illustrated in FIG. 12 to control the switches SW1 and SW2 in response to a light beam direction control signal. The control circuit 4 can have a different circuit configuration.

The control circuit 4 connected with the transparent conductive film (second electrode) 15 controls the switches SW1 and SW2 to change the state among application of a predetermined voltage (first voltage) V1 for maintaining a wide viewing angle state of the light beam direction control element 1, a ground state (short-circuit state), and an open-circuit state. The control circuit 4 also grounds the transparent conductive film (first electrode) 12.

Upon receipt of a light beam direction control signal (wide viewing angle signal) requesting a wide viewing angle state from the external, the controller 40 controls the switch SW1 to change the voltage to be applied to the transparent conductive film (second electrode) 15 to the predetermined voltage V1. Like in the first embodiment, the voltage V1 is applied across the transparent conductive films 12 and 15, so that the electrophoretic particles (colored charged particles) 140 in the light beam absorbing regions 14 gather toward the transparent conductive film 15 of the second electrode. As a result, the light beam direction control element 1 becomes a wide viewing angle state.

Next, as a feature of the third embodiment, operation of the controller 40 in response to a light beam direction control signal (narrow viewing angle signal) requesting a narrow viewing angle state is described. Upon receipt of a narrow viewing angle signal from the external, the controller 40 executes the flowchart in FIG. 13. FIG. 13 illustrates an example of control processing in response to a narrow viewing angle signal in the third embodiment.

First, at Step S1, the controller 40 receives a narrow viewing angle signal. Next, at Step S2, the controller 40 controls the switches SW1 and SW2 to ground the transparent conductive film (second electrode) 15. This operation makes both of the transparent conductive films 12 and 15 grounded to become short-circuited. The transmittance at the angle α starts decreasing because of the short-circuit of the transparent conductive films 12 and 15.

Next, at Step S3, the controller 40 stands by until a predetermined time t1 passes. During this period, the transmittance at the angle α drastically decreases. When the predetermined time t1 passes, the controller 40 performs Step S4 to change the connection between the transparent conductive film (second electrode) 15 and the transparent conductive film (first electrode) 12 from short-circuit to open-circuit. The transmittance at the angle α gradually and slowly decreases without increasing because of the change from short-circuiting to open-circuiting the transparent conductive films 12 and 15.

The information on the predetermined time t1 is preset to the controller 40. The designer of the light beam direction control device can determine the appropriate time t1 by observing the temporal variation in transmittance after short-circuiting the transparent conductive films 12 and 15 with a predetermined voltage applied.

As described above, the third embodiment achieves smooth and quick transition of the light beam direction control element 1 from a wide viewing angle state to a narrow viewing angle state.

Fourth Embodiment

Figure 14:
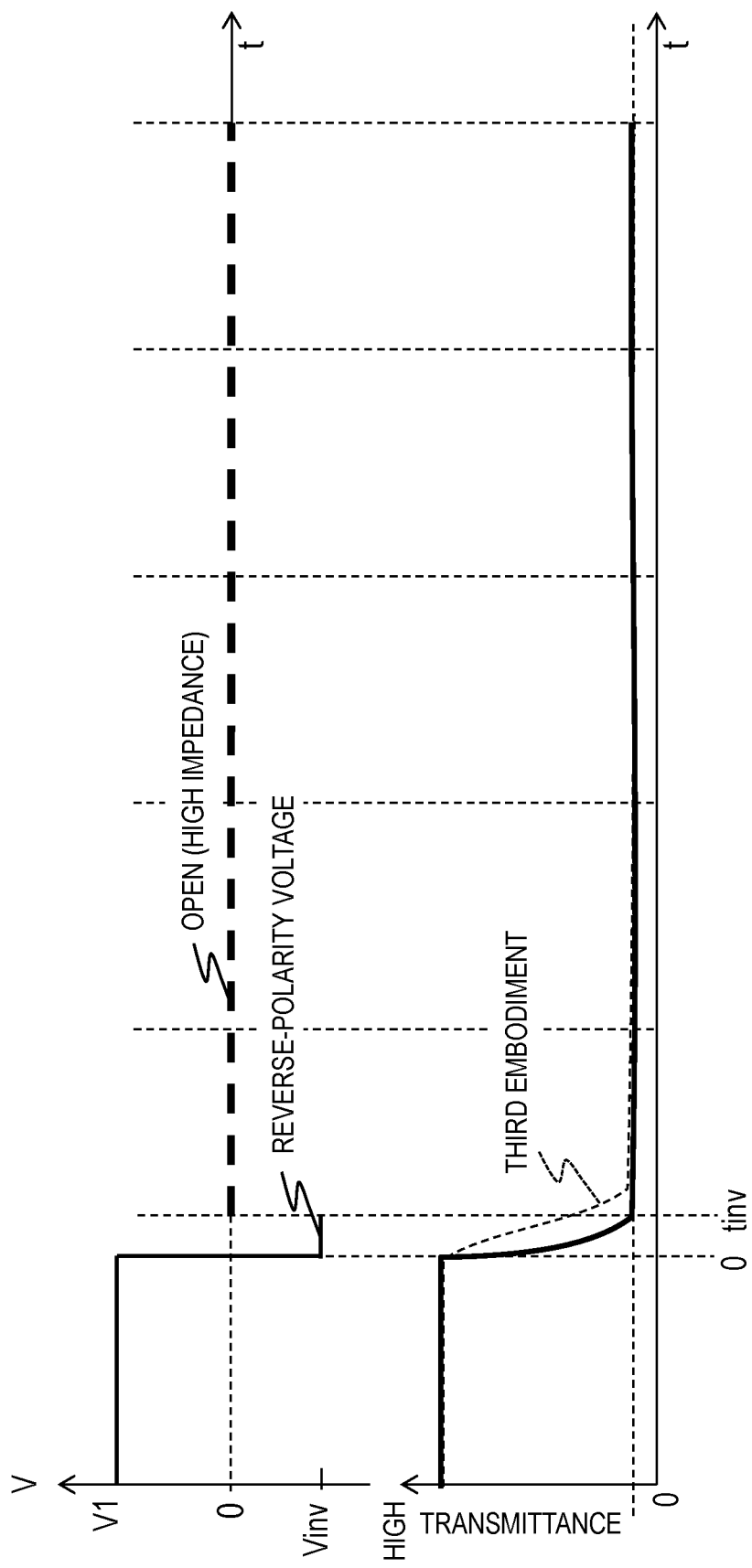
FIG. 14 is a graph indicating the result of measuring the transient change of the transmittance at the angle α measured in FIG. 7A corresponding to the change in the voltage applied to the light beam direction control element according to a fourth embodiment.
Figure 15:
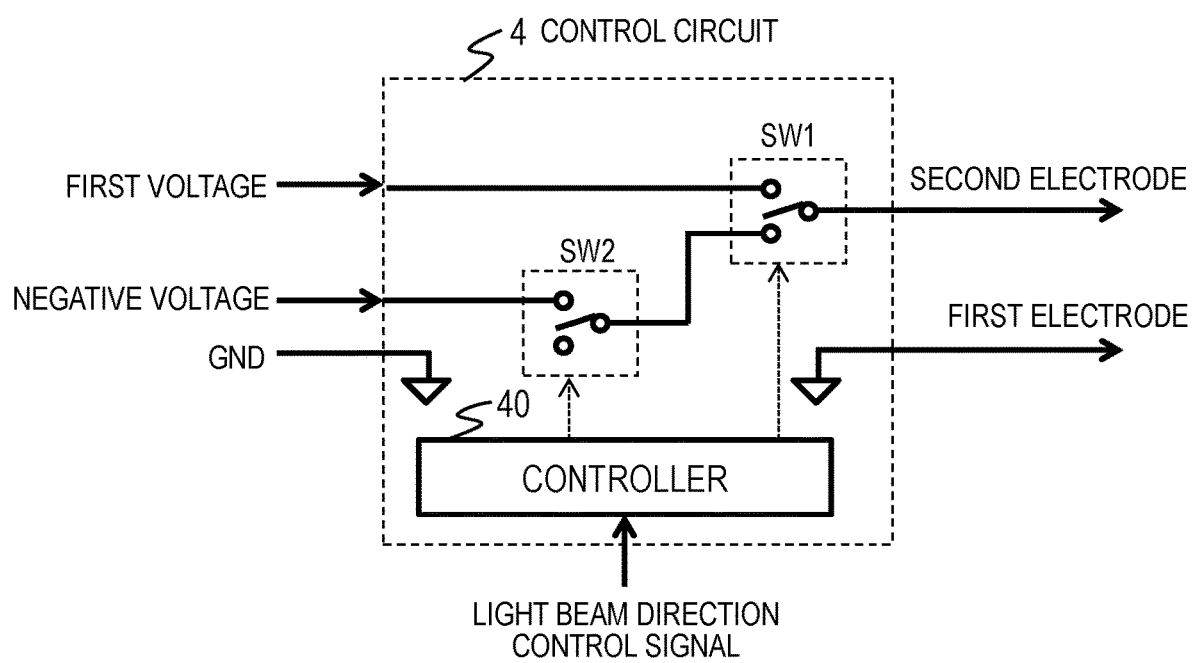
FIG. 15 is a block diagram illustrating an example of the configuration of the control circuit according to the fourth embodiment.
Figure 16:
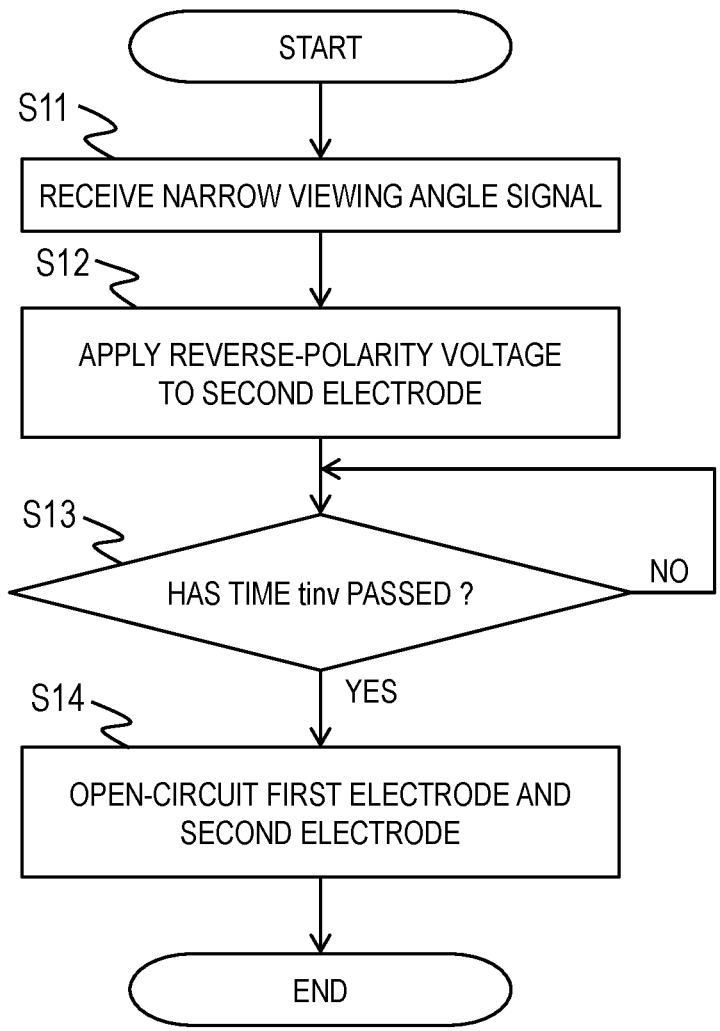
FIG. 16 is a flowchart an example of control processing in response to a narrow viewing angle signal according to the fourth embodiment.

FIGS. 14 to 16 illustrate the fourth embodiment. The fourth embodiment applies a voltage having the reverse-polarity from the polarity of the voltage applied in a wide viewing angle state in changing the light beam direction control element 1 from a wide viewing angle state to a narrow viewing angle state. Because of the electric field generated by application of voltage having the reverse-polarity across the transparent conductive films 12 and 15, the electrophoretic particles 140 receive force in the inverse direction and move quickly from the transparent conductive film (second electrode) 15 toward the transparent conductive film (first electrode) 12. For this reason, this embodiment can decrease the transmittance at the angle α faster than the third embodiment.

FIG. 14 provides a graph representing a result of measurement of transient response in transmittance at the angle α in FIGS. 7A and 7B in response to change of the voltage applied to the light beam direction control element 1 in accordance with the fourth embodiment. Specifically, FIG. 14 includes a graph representing the temporal variation in voltage applied to the light beam direction control element 1 and a graph representing the temporal variation in transmittance. The time to switch from applying the predetermined voltage V1 to applying the reverse-polarity voltage across the transparent conductive films 12 and 15 is defined as time 0.

The solid line from the time 0 to time tinv in the graph of the temporal variation in applied voltage represents the predetermined voltage Vinv having the reverse-polarity from the polarity of the voltage V1 applied across the transparent conductive films 12 and 15. The broken line from the time tinv represents the applied voltage in the period while the transparent conductive films 12 and 15 are electrically separated and open-circuited (at high impedance). In the graph representing the temporal variation in transmittance, the broken line represents the temporal variation in transmittance in the third embodiment. The solid line represents the temporal variation in transmittance with the variation in applied voltage in FIG. 14.

As indicated in FIG. 14, the transmittance decreases faster than the transmittance in the third embodiment (broken line in FIG. 14) in the period (from 0 to tinv) while a predetermined reverse-polarity voltage is applied across the transparent conductive films 12 and 15. Keeping applying the reverse-polarity voltage collects the electrophoretic particles 140 to the proximity of the transparent conductive film (first electrode) 12 to increase the transmittance. For this reason, in the measurement of the transmittance, the transparent conductive films 12 and 15 were open-circuited at the time (tinv) when the transmittance reached substantially the minimum value. Then, it was revealed that a narrow viewing angle state can be stabilized without increase in transmittance after the time tinv.

FIG. 15 is a block diagram illustrating an example of the configuration of the control circuit 4 in the fourth embodiment. The light beam direction control device in the fourth embodiment includes a light beam direction control element 1 and a control device 2 as illustrated in FIG. 1. The description of the configuration other than the configuration of the control circuit 4 is omitted. The light beam direction control element 1 can have the configuration of the light beam direction control element in the second embodiment illustrated in FIG. 10.

As illustrated in FIG. 15, the control circuit 4 in the fourth embodiment includes a switch SW1, another switch SW2, and a controller 40. The controller 40 includes a processor, a memory, and an interface which are not illustrated in FIG. 15 to control the switches SW1 and SW2 in response to a light beam direction control signal. The control circuit 4 can have a different circuit configuration.

The control circuit 4 connected with the transparent conductive film (second electrode) 15 changes the state among application of a predetermined voltage (first voltage) V1 for maintaining a wide viewing angle state of the light beam direction control element 1, application of a predetermined negative voltage (reverse-polarity voltage Vinv), and an open-circuit state. The control circuit 4 also grounds the transparent conductive film (first electrode) 12.

Upon receipt of a light beam direction control signal (wide viewing angle signal) requesting a wide viewing angle state from the external, the controller 40 controls the switch SW1 to apply the predetermined voltage V1 to the transparent conductive film (second electrode) 15. Like in the first embodiment, the voltage V1 is applied across the transparent conductive films 12 and 15, so that the electrophoretic particles 140 in the light beam absorbing regions 14 gather toward the transparent conductive film 15 of the second electrode. As a result, the light beam direction control element 1 becomes a wide viewing angle state.

Next, as a feature of the fourth embodiment, operation of the controller 40 in response to a light beam direction control signal (narrow viewing angle signal) requesting a narrow viewing angle state is described. Upon receipt of a narrow viewing angle signal from the external, the controller 40 executes the flowchart in FIG. 16. FIG. 16 illustrates an example of control processing in response to a narrow viewing angle signal in the fourth embodiment.

First, at Step S11, the controller 40 receives a narrow viewing angle signal. Next, at Step S12, the controller 40 controls the switches SW1 and SW2 to change the voltage to be applied to the transparent conductive film (second electrode) 15 from the voltage V1 to a negative voltage (reverse-polarity voltage Vinv). Since the polarity of the potential difference between the transparent conductive films 12 and 15 changes to the reverse, the electrophoretic particles 140 start dispersing. As a result, the transmittance at the angle α starts decreasing.

Next, at Step S13, the controller 40 stands by until a predetermined time tinv passes. During this period, the potential difference between the transparent conductive films 12 and 15 is maintained at the reverse-polarity. Accordingly, the electrophoretic particles 140 disperse quickly. As a result, the transmittance at the angle α drastically decreases.

When the predetermined time tinv passes, the controller 40 controls the switch SW2 at Step S14 to open-circuit the transparent conductive film (second electrode) 15 and the transparent conductive film (first electrode) 12. As a result, the transmittance at the angle α reaches a specific value and the light beam direction control element 1 becomes a stabilized narrow viewing angle state.

The information on the predetermined time tinv is preset to the controller 40. The designer of the light beam direction control device can determine the appropriate time tinv by observing the temporal variation in transmittance after applying the reverse-polarity voltage across the transparent conductive films 12 and 15.

As described above, the fourth embodiment can change the light beam direction control element 1 from a wide viewing angle state to a narrow viewing angle state more quickly.

Fifth Embodiment

Figure 17:
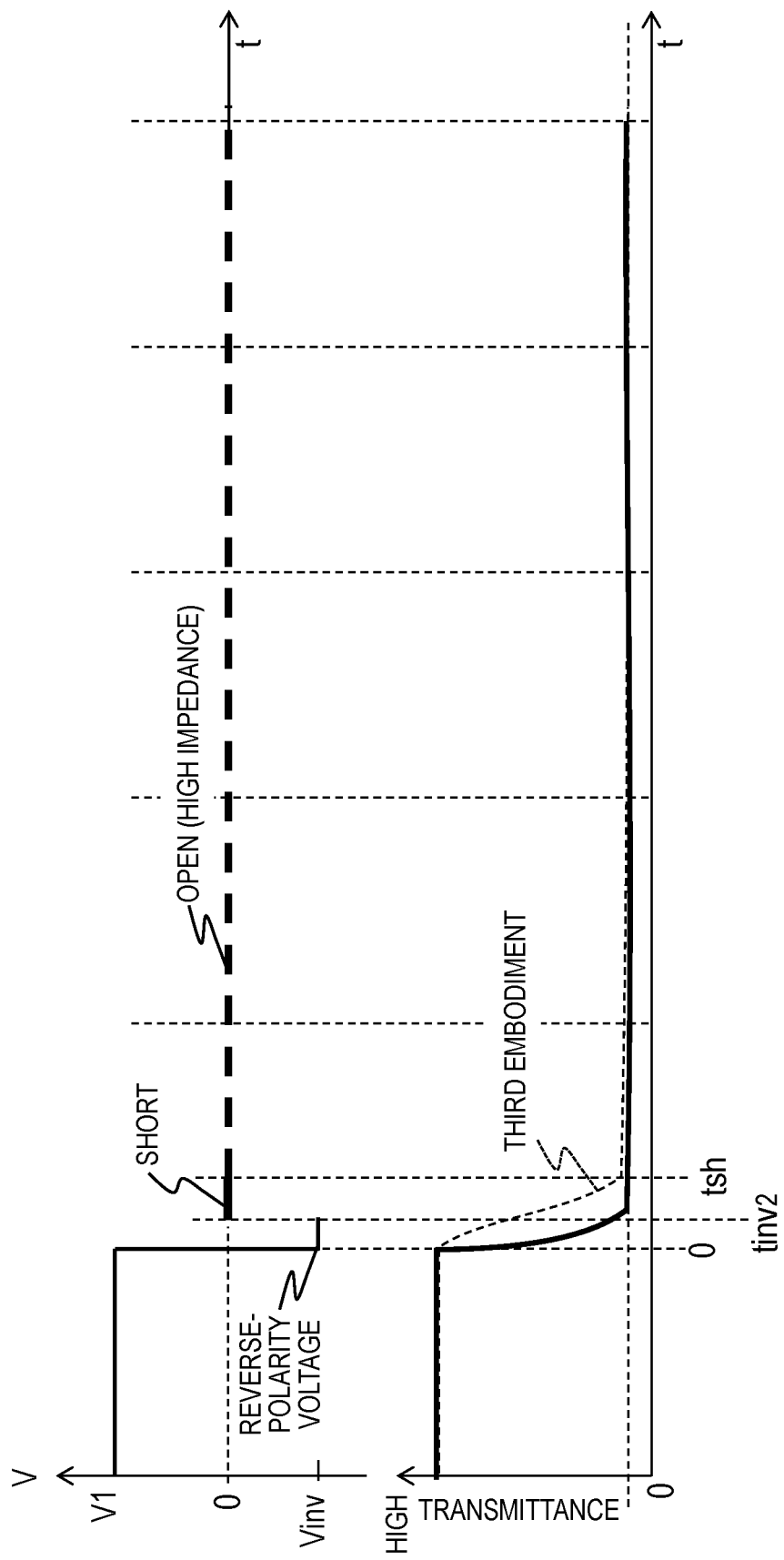
FIG. 17 is a graph indicating the result of measuring the transient change of the transmittance at the angle α measured in FIG. 7A corresponding to the change in the voltage applied to the light beam direction control element according to a fifth embodiment.
Figure 18:
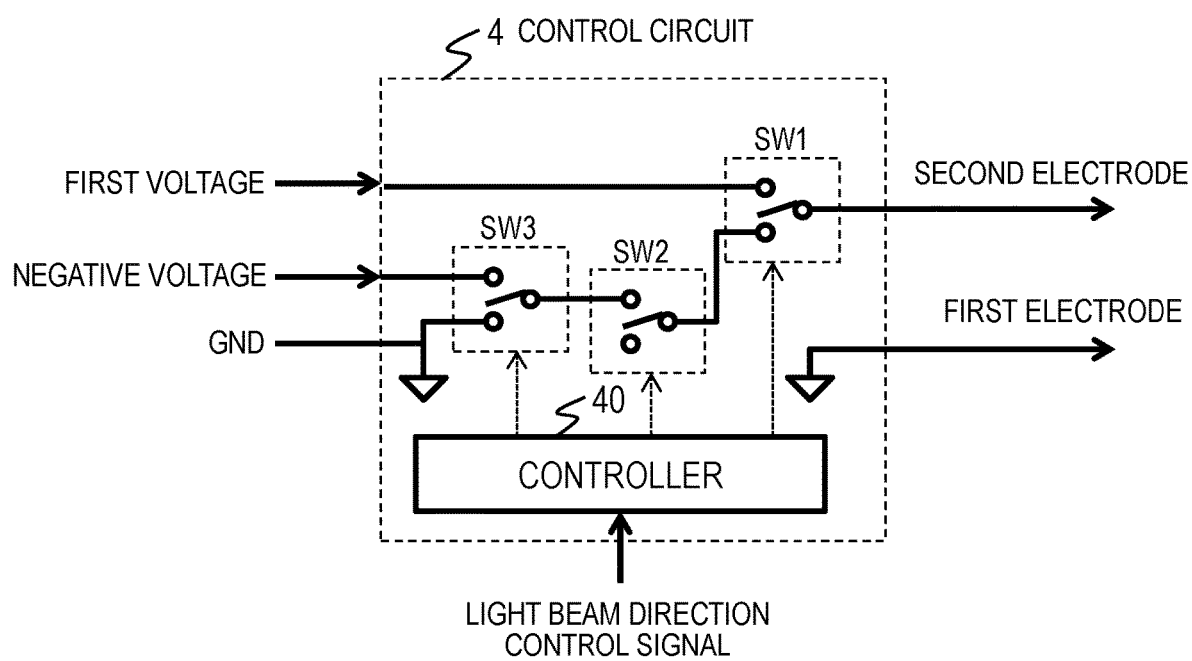
FIG. 18 is a block diagram illustrating an example of the configuration of the control circuit according to the fifth embodiment.
Figure 19:
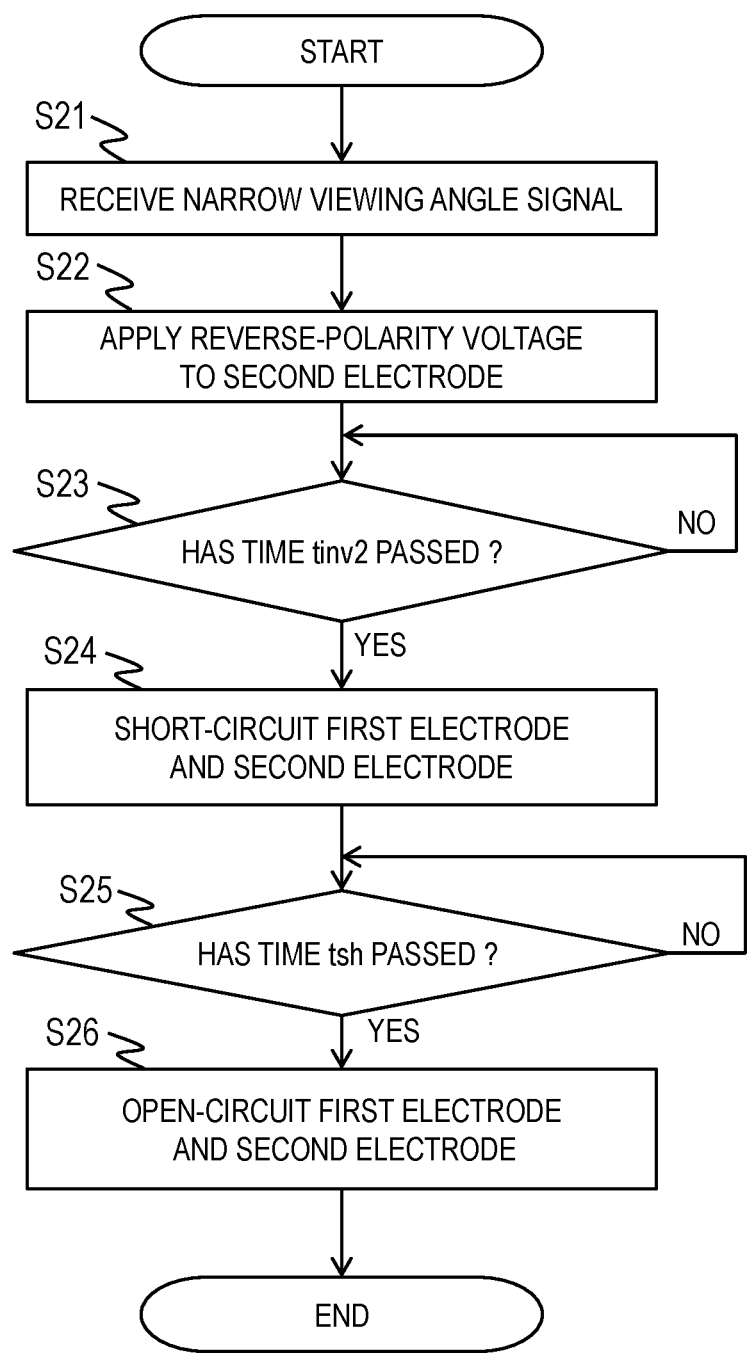
FIG. 19 is a flowchart an example of control processing in response to a narrow viewing angle signal according to the fifth embodiment.

FIGS. 17 to 19 illustrate the fifth embodiment. The fifth embodiment once short-circuits the transparent conductive films 12 and 15 after the period for applying the reverse-polarity voltage Vinv in the fourth embodiment 4, and then open-circuits the transparent conductive films 12 and 15. Because of the electric field generated by application of the reverse-polarity voltage across the transparent conductive films 12 and 15, the electrophoretic particles 140 receive force in the inverse direction and move quickly from the transparent conductive film (second electrode) 15 toward the transparent conductive film (first electrode) 12. For this reason, this embodiment can decrease the transmittance at the angle α faster than the third embodiment.

FIG. 17 provides a graph representing a result of measurement of transient response in transmittance at the angle α in FIGS. 7A and 7B in response to change of the voltage applied to the light beam direction control element 1 in accordance with the fifth embodiment. Specifically, FIG. 17 includes a graph representing the temporal variation in voltage applied to the light beam direction control element 1 and a graph representing the temporal variation in transmittance. The time to switch from applying the predetermined voltage V1 to applying the reverse-polarity voltage across the transparent conductive films 12 and 15 is defined as time 0.

The solid line from the time 0 to time tinv2 in the graph of the temporal variation in applied voltage represents the predetermined voltage Vinv having the reverse-polarity from the polarity of the voltage V1 applied across the transparent conductive films 12 and 15. The solid line from the time tinv2 to the time tsh represents the applied voltage in the period while the transparent conductive films 12 and 15 are short-circuited. The broken line from the time tsh represents the applied voltage in the period while the transparent conductive films 12 and 15 are electrically separated and open-circuited (at high impedance).

In the graph representing the temporal variation in transmittance, the broken line represents the temporal variation in transmittance in the third embodiment. The solid line represents the temporal variation in transmittance with the variation in applied voltage (connection between the transparent conductive films 12 and 15) in FIG. 17.

As indicated in FIG. 17, during the period (from 0 to tinv2) while the predetermined reverse-polarity voltage Vinv is applied across the transparent conductive films 12 and 15, the transmittance decreases faster than the transmittance in the third embodiment, like in the fourth embodiment. Keeping applying the reverse-polarity voltage collects the electrophoretic particles 140 to the proximity of the transparent conductive film (first electrode) 12 to decrease the transmittance.

For this reason, in the measurement of the transmittance, the transparent conductive films 12 and 15 were once short-circuited at the time (tinv2) when the transmittance reached substantially the minimum value and then open-circuited. It was revealed that a narrow viewing angle state was stabilized without increase in transmittance after the time tsh at which the connection was switched from the short-circuit to open-circuit.

FIG. 18 is a block diagram illustrating an example of the configuration of the control circuit 4 in the fifth embodiment. The light beam direction control device in the fifth embodiment includes a light beam direction control element 1 and a control device 2 as illustrated in FIG. 1. The description of the configuration other than the configuration of the control circuit 4 is omitted. The light beam direction control element 1 can have the configuration of the light beam direction control element in the second embodiment illustrated in FIG. 10.

As illustrated in FIG. 18, the control circuit 4 in the fifth embodiment includes a switch SW1, another switch SW2, still another switch SW3, and a controller 40. The controller 40 includes a processor, a memory, and an interface which are not illustrated in FIG. 18 to control the switches SW1, SW2, and SW3 in response to a light beam direction control signal. The control circuit 4 can have a different circuit configuration.

The control circuit 4 connected with the transparent conductive film (second electrode) 15 changes the state among application of a predetermined voltage (first voltage) V1 for maintaining a wide viewing angle state of the light beam direction control element 1, application of a predetermined negative voltage (reverse-polarity voltage Vinv), a short-circuit (ground) state, and an open-circuit state. The control circuit 4 also grounds the transparent conductive film (first electrode) 12.

Upon receipt of a light beam direction control signal (wide viewing angle signal) requesting a wide viewing angle state from the external, the controller 40 controls the switch SW1 to apply the predetermined voltage V1 to the transparent conductive film (second electrode) 15. Like in the first embodiment, the voltage V1 is applied across the transparent conductive films 12 and 15, so that the electrophoretic particles 140 in the light beam absorbing regions 14 gather toward the transparent conductive film 15 of the second electrode. As a result, the light beam direction control element 1 becomes a wide viewing angle state.

Next, as a feature of the fifth embodiment, operation of the controller 40 in response to a light beam direction control signal (narrow viewing angle signal) requesting a narrow viewing angle state is described. Upon receipt of a narrow viewing angle signal from the external, the controller 40 executes the flowchart in FIG. 19. FIG. 19 illustrates an example of control processing in response to a narrow viewing angle signal in the fifth embodiment.

First, at Step S21, the controller 40 receives a narrow viewing angle signal. Next, at Step S22, the controller 40 controls the switches SW1, SW2, and SW3 to change the voltage to be applied to the transparent conductive film (second electrode) 15 from the voltage V1 to a negative voltage (reverse-polarity voltage Vinv). Since the polarity of the potential difference between the transparent conductive films 12 and 15 changes to the reverse, the electrophoretic particles 140 start dispersing. As a result, the transmittance at the angle α starts decreasing.

Next, at Step S23, the controller 40 stands by until a predetermined time tinv2 passes. During this period, the potential difference between the transparent conductive films 12 and 15 is maintained at the reverse-polarity. Accordingly, the electrophoretic particles 140 disperse quickly. As a result, the transmittance at the angle α drastically decreases.

When the predetermined time tinv2 passes, the controller 40 controls the switches SW2 and SW3 at Step S24 to ground the transparent conductive film (second electrode) 15 and short-circuit the transparent conductive film (second electrode) 15 and the transparent conductive film (first electrode) 12. Next, at Step S25, the controller 40 stands by until a predetermined time tsh passes.

When the predetermined time tsh passes, the controller 40 controls the switches SW2 and SW3 at Step S26 to open-circuit the transparent conductive film (second electrode) 15 and the transparent conductive film (first electrode) 12. As a result, the transmittance at the angle α reaches a specific value and the light beam direction control element 1 becomes a stabilized narrow viewing angle state.

The information on the predetermined times tinv2 and tsh is preset to the controller 40. The designer of the light beam direction control device can determine the appropriate times tinv2 and tsh by observing the temporal variation in transmittance after applying the reverse-polarity voltage across the transparent conductive films 12 and 15.

As described above, the fifth embodiment can change the light beam direction control element 1 from a wide viewing angle state to a narrow viewing angle state more quickly. Compared to the fourth embodiment, adding short-circuiting after applying the reverse-polarity voltage may allow the period until tinv2 for applying the reverse-polarity voltage to be shorter than the period until tinv or the reverse-polarity voltage to be low. This achieves low power consumption, compared to the fourth embodiment.

Sixth Embodiment

FIGS. 20 to 23 illustrate the sixth embodiment. This embodiment is characterized by separating the voltage to be applied for a wide viewing angle state of the light beam direction control element 1 into the voltage to be applied in changing the light beam direction control element 1 from a narrow viewing angle state to the wide viewing angle state and the voltage to be applied to maintain the wide viewing angle state.

Figure 20:
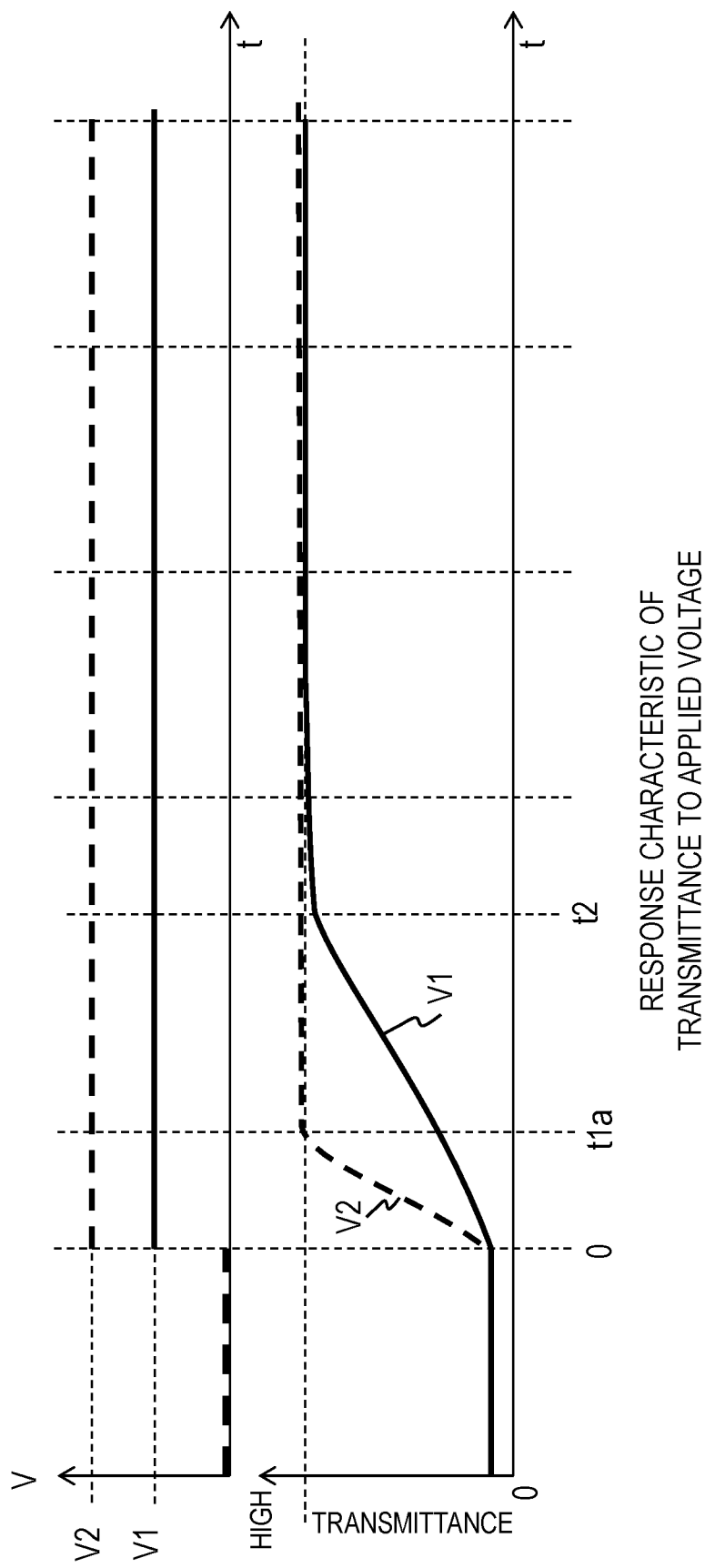
FIG. 20 is a graph indicating the result of measuring the transient change of the transmittance at the angle α measured in FIG. 7A corresponding to the change in the voltage applied to the light beam direction control element according to a sixth embodiment.

FIG. 20 provides graphs representing results of measurement of transient response in transmittance at the angle α in FIGS. 7A and 7B in response to change of the voltage applied to the light beam direction control element 1 in the sixth embodiment. Specifically, FIG. 20 includes graphs representing the temporal variation in voltage applied to the light beam direction control element 1 and graphs representing the temporal variation in transmittance. The time to start applying a predetermined voltage across the transparent conductive films 12 and 15 to switch from a narrow viewing angle state where the transparent conductive films 12 and 15 are open-circuited to a wide viewing angle state is defined as time 0.

The solid line from the time 0 in the graphs of the temporal variation in applied voltage represents a predetermined first voltage V1 applied across the transparent conductive films 12 and 15. The dashed line from the time 0 represents a predetermined second voltage V2 higher than the first voltage V1 applied across the transparent conductive films 12 and 15. The solid line from the time 0 in the graphs representing the temporal variation in transmittance represents the temporal variation in transmittance during the period while the first voltage V1 is applied across the transparent conductive films 12 and 15. The dashed line from the time 0 represents the temporal variation in transmittance during the period while the second voltage V2 is applied across the transparent conductive films 12 and 15.

In the case of applying the first voltage V1, the transmittance at the angle α increased gently until time t2 and reached a stable wide viewing angle state at the time t2. In the other case of applying the second voltage V2, the transmittance at the angle α increased faster than in the case of the first voltage V1 and reached a stable wide viewing angle state at time t1a earlier than the time t2.

The foregoing measurement in the sixth embodiment revealed that, when the applied voltage across the transparent conductive films 12 and 15 is different, the increasing rate of the transmittance at the angle α is different but the reached maximum transmittance does not have a big difference. This indicates that the lower first voltage V1 can maintain a wide viewing angle state.

Accordingly, this embodiment first applies the second voltage V2 across the transparent conductive films 12 and 15 to achieve more quick transition from a narrow viewing angle state to a wide viewing angle state. When a wide viewing angle state is achieved at the time t1a, this embodiment applies the first voltage V1 lower than the second voltage V2 across the transparent conductive films 12 and 15 to maintain the wide viewing angle state.

This separating the voltage to be applied into the voltage to be applied to change the light beam direction control element 1 from a narrow viewing angle state to a wide viewing angle state and the voltage to be applied to maintain the wide viewing angle state enables quick state transition and further, low power consumption.

Figure 21:
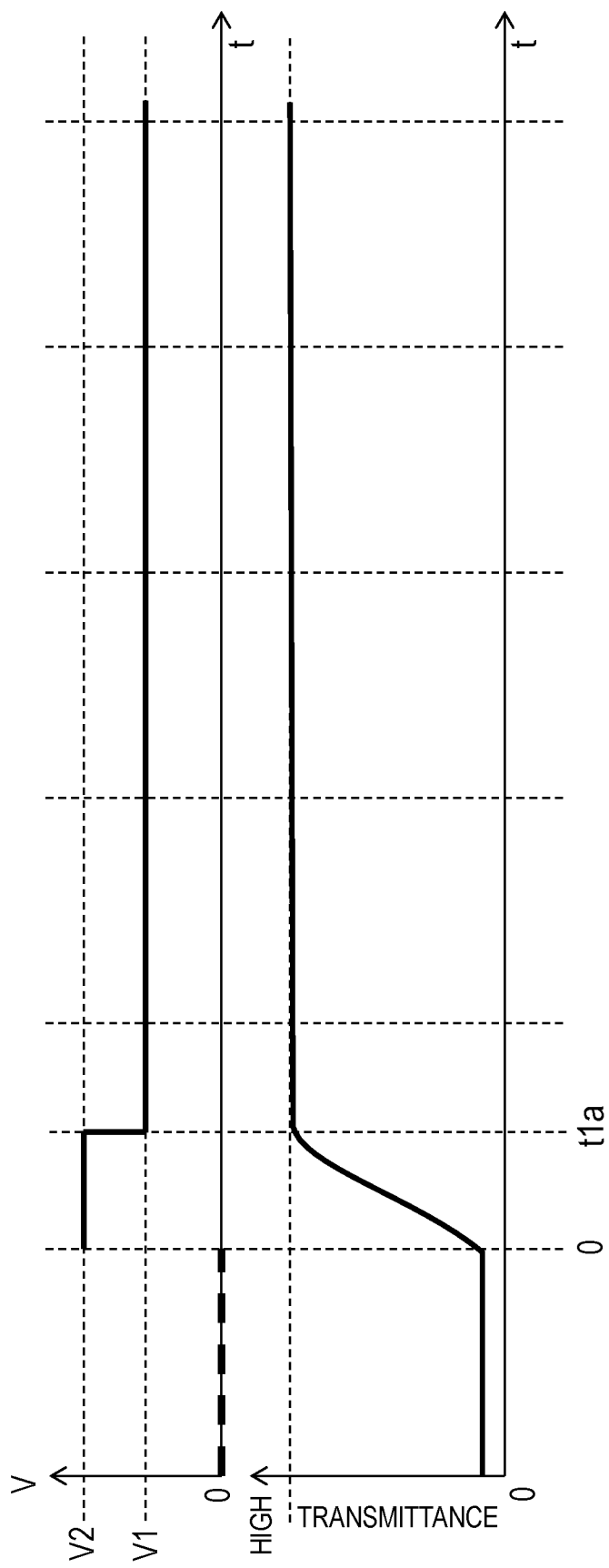
FIG. 21 is a graph indicating the result of measuring the transient change of the transmittance at the angle α measured in FIG. 7A corresponding to the change in the voltage applied to the light beam direction control element according to the sixth embodiment.

FIG. 21 provides a graph representing a result of measurement of transient response in transmittance at the angle α in FIGS. 7A and 7B in response to change of the voltage applied to the light beam direction control element 1 in accordance with the sixth embodiment. Specifically, FIG. 21 includes a graph representing the temporal variation in voltage applied to the light beam direction control element 1 and a graph representing the temporal variation in transmittance. The time to start applying the predetermined voltage V2 across the transparent conductive films 12 and 15 to switch from a narrow viewing angle state in which the transparent conductive films 12 and 15 are open-circuited to a wide viewing angle state is defined as time 0.

The broken line before the time 0 in the graph representing the temporal variation in applied voltage indicates that the transparent conductive films 12 and 15 are open-circuited. The solid line from the time 0 in the graph representing the temporal variation in applied voltage represents the temporal variation in voltage applied across the transparent conductive films 12 and 15.

In changing the light beam direction control element 1 from a narrow viewing angle state to a wide viewing angle state, this embodiment applies the second voltage V2 across the transparent conductive films 12 and 15 in the period from the time 0 to the time t1a and applies the first voltage V1 lower than the second voltage V2 after the time t1a.

Figure 22:
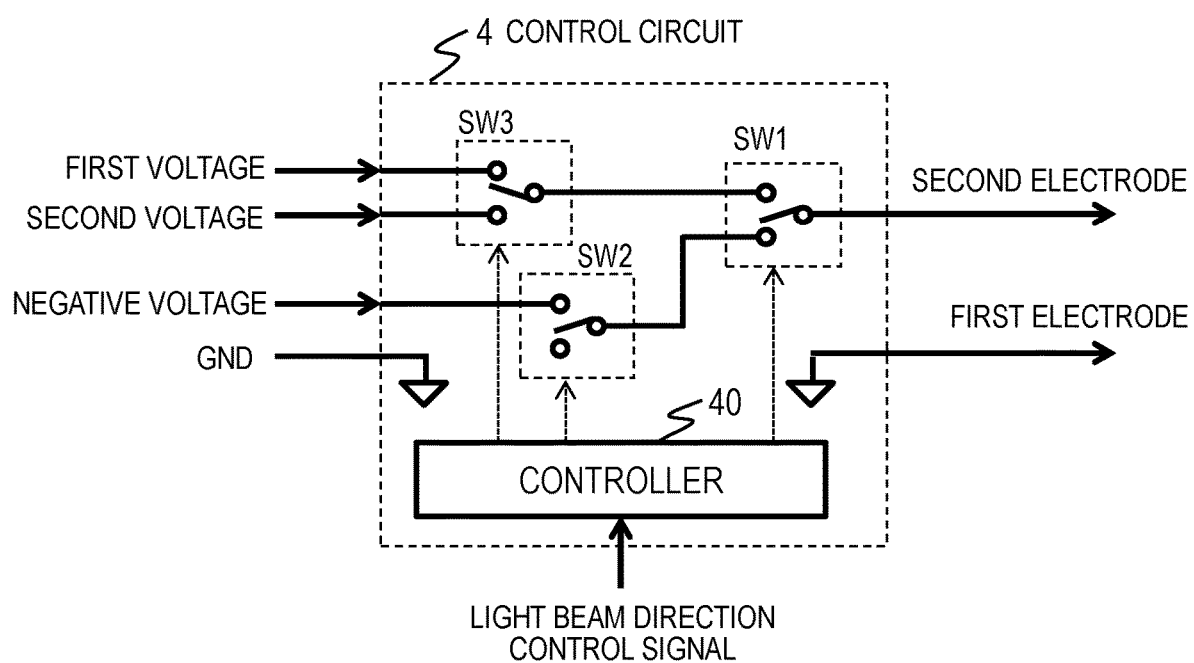
FIG. 22 is a block diagram illustrating an example of the configuration of the control circuit according to the sixth embodiment.

FIG. 22 is a block diagram illustrating an example of the configuration of the control circuit 4 in the sixth embodiment. The light beam direction control device in the sixth embodiment includes a light beam direction control element 1 and a control device 2 as illustrated in FIG. 1. The description of the configuration other than the configuration of the control circuit 4 is omitted. The light beam direction control element 1 can have the configuration of the light beam direction control element in the second embodiment illustrated in FIG. 10.

As illustrated in FIG. 22, the control circuit 4 in the sixth embodiment includes a switch SW1, another switch SW2, still another switch SW3, and a controller 40. The controller 40 includes a processor, a memory, and an interface which are not illustrated in FIG. 22 to control the switch SW1, SW2, and SW3 in response to a light beam direction control signal. The control circuit 4 can have a different circuit configuration.

The control circuit 4 connected with the transparent conductive film (second electrode) 15 changes the state among application of a predetermined second voltage V2 to change the light beam direction control element 1 from a narrow viewing angle state to a wide viewing angle state, application of a predetermined voltage V1 to maintain a wide viewing angle state of the light beam direction control element 1, application of a predetermined negative voltage, and an open-circuit state. The control circuit 4 also grounds the transparent conductive film (first electrode) 12.

Upon receipt of a light beam direction control signal (narrow viewing angle signal) requesting a narrow viewing angle state from the external, the controller 40 changes the light beam direction control element 1 from a wide viewing angle state to a narrow viewing angle state with the operation described in the fourth embodiment, for example.

Figure 23:
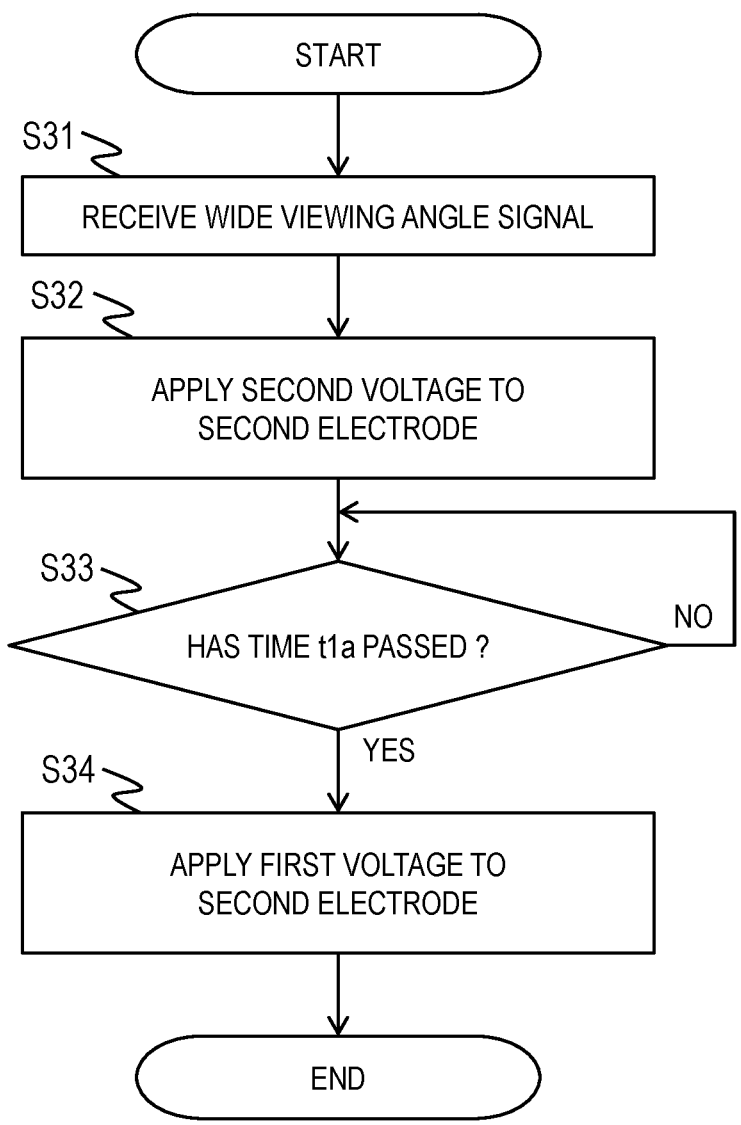
FIG. 23 is a flowchart an example of control processing in response to a wide viewing angle signal according to the sixth embodiment.

Next, as a feature of the sixth embodiment, operation of the controller 40 in response to a light beam direction control signal (wide viewing angle signal) requesting a wide viewing angle state is described. Upon receipt of a wide viewing angle signal from the external, the controller 40 executes the flowchart in FIG. 23. FIG. 23 illustrates an example of control processing in response to a wide viewing angle signal in the sixth embodiment.

First, at Step S31, the controller 40 receives a wide viewing angle signal. Next, at Step S32, the controller 40 controls the switches SW1 and SW2 to change the voltage to be applied to the transparent conductive film (second electrode) 15 to the second voltage V2. As a result, the second voltage V2 is applied across the transparent conductive films 12 and 15. Because of the second voltage V2, the electrophoretic particles 140 in the light absorbing regions 14 start moving toward the transparent conductive film (second electrode) 15.

At Step S33, the controller 40 stands by until a predetermined time t1a passes. During this period from the time 0 to time t1a, the electrophoretic particles 140 are gathered to the proximity of the transparent conductive film (second electrode) 15 because of the applied second voltage V2. As a result, the light beam direction control element 1 changes from a narrow viewing angle state to a wide viewing angle state.

When the predetermined time t1a passes, the controller 40 controls the switch SW3 at Step S34 to change the voltage to be applied to the transparent conductive film (second electrode) 15 to the lower first voltage V1. As a result, the low first voltage V1 is applied across the transparent conductive films 12 and 15. The electrophoretic particles 140 are maintained in the state where they are gathered in the proximity of the transparent conductive film (second electrode) 15. The wide viewing angle state can be maintained steadily with the first voltage V1 with low power consumption.

As described above, the sixth embodiment can change the light beam direction control element 1 from a narrow viewing angle state to a wide viewing angle state quickly and also, maintain the wide viewing angle state with low power consumption.

Seventh Embodiment

FIGS. 33 to 37 illustrate the seventh embodiment. The seventh embodiment aims to quickly change the light beam direction control element 1 from a narrow viewing angle state to a wide viewing angle state and maintain the wide viewing angle state with low power consumption like the sixth embodiment and is characterized by employing a period while the transparent conductive films 12 and 15 are open-circuited to maintain the wide viewing angle state.

As described with reference to FIG. 20 in the sixth embodiment, the transition from a narrow viewing angle state to a wide viewing angle state is faster when the voltage (second voltage) applied across the transparent conductive films 12 and 15 is higher.

The temporal variation in transmittance measured at the angle α with a given applied voltage or the response characteristic of the light beam direction control element 1 is determined depending on the structure (such as the width and height) of the light beam absorbing regions 14 and the structure and properties of the voltage application means (such as whether the insulating films 17 and 18 are provided on the transparent conductive films 12 and 15 and the properties such as the thickness and the refractive index of the insulating films 17 and 18), and the properties of the electrophoretic elements encapsulated in the light beam absorbing regions 14 (such as the properties of the colored charged particles and the dispersion medium 141).

Raising the transition voltage (second voltage) is an effective means for a light beam direction control element 1 indicating a slow response to achieve quick transition from a narrow viewing angle state to a wide viewing angle state; however, it was revealed that the maintenance voltage (first voltage) needs to be higher when the transition voltage is higher.

Figure 33:
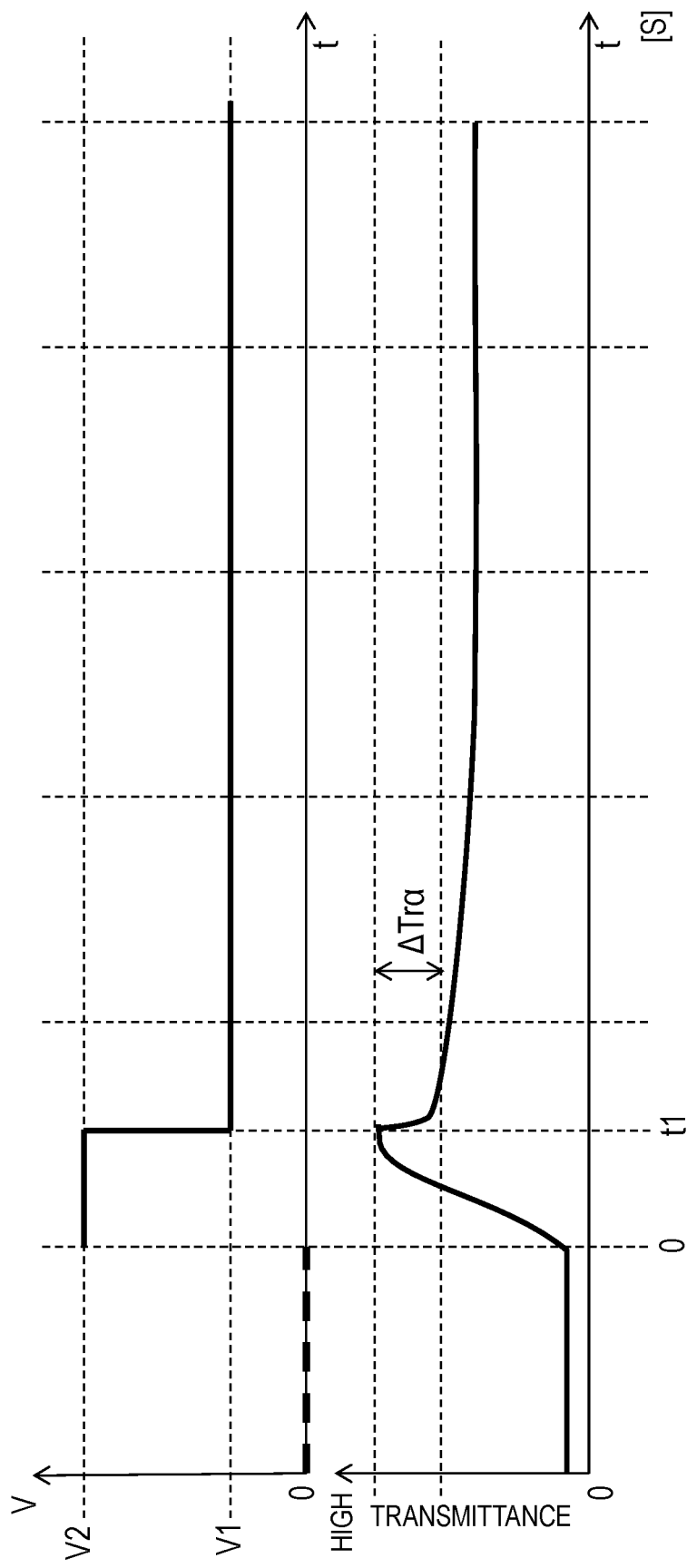
FIG. 33 is a graph indicating the result of measuring the transient change of the transmittance at the angle α measured in FIG. 7A corresponding to the change in the voltage applied to the light beam direction control element according to a seventh embodiment.
Figure 34:
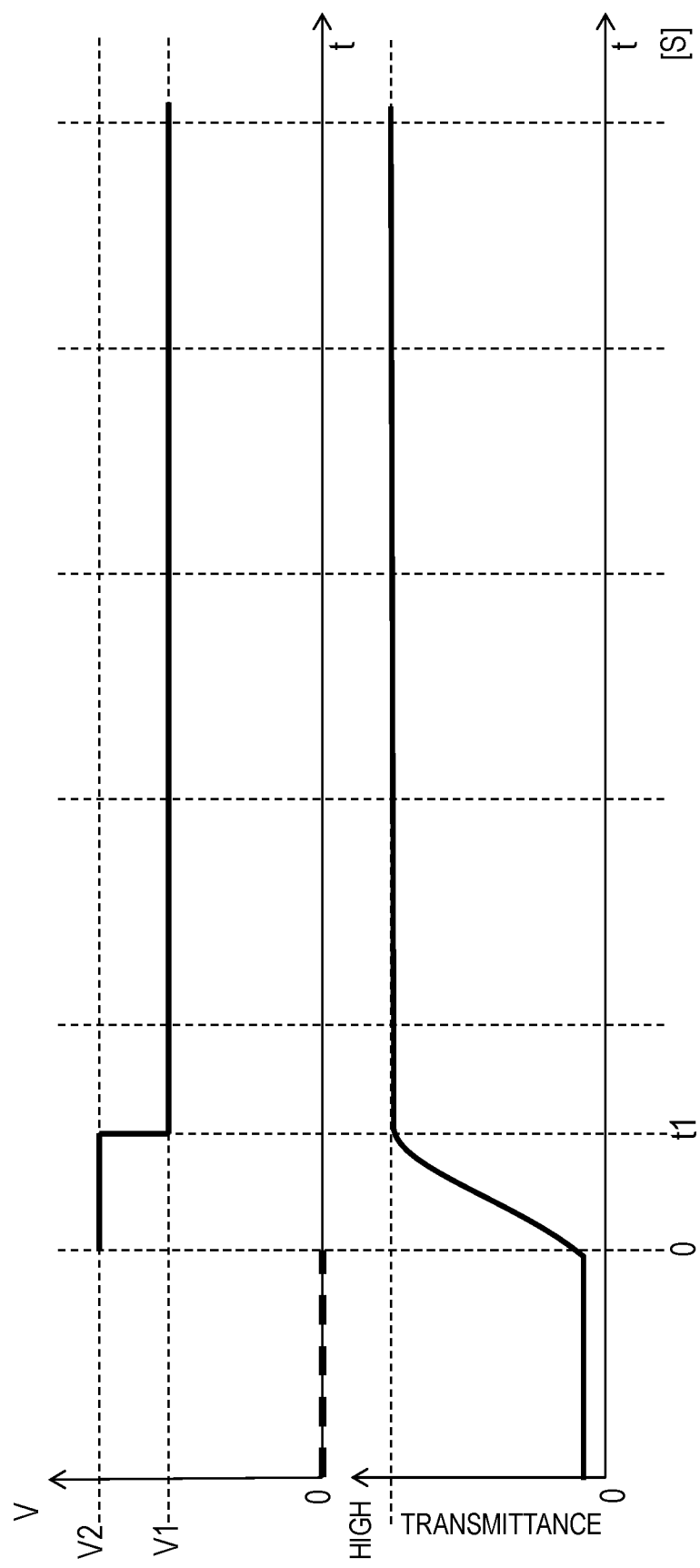
FIG. 34 is a graph indicating the result of measuring the transient change of the transmittance at the angle α measured in FIG. 7A corresponding to the change in the voltage applied to the light beam direction control element according to the seventh embodiment.

FIG. 33 provides transient response in transmittance measured at the angle α when the maintenance voltage (first voltage) V1 is insufficient compared to high transition voltage (second voltage) V2; FIG. 34 provides transient response in transmittance when the maintenance voltage (first voltage) V1 is sufficiently high.

As indicated in FIG. 33, when the maintenance voltage (first voltage) V1 is insufficient, the transmittance decreases after the time t1 at which the transition voltage V2 is switched to the maintenance voltage V1. Defining the variation in transmittance at the angle α that can be recognized by a human as ΔTrα, the user using the light beam direction control element 1 driven as indicated in FIG. 33 perceives the variation such that the viewing angle is narrowed down with uncomfortableness immediately after change to a wide viewing angle state.

If the maintenance voltage (first voltage) V1 is high enough as indicated in FIG. 34, the wide viewing angle state can be maintained as described in the sixth embodiment; however, the raising the first voltage reduces the effects of low power consumption.

As described with reference to FIG. 8 in the first embodiment, when the transparent conductive films 12 and 15 with a voltage applied are open-circuited, the decrease in transmittance is gentle, compared to the case where the transparent conductive films 12 and 15 are short-circuited.

Figure 35:
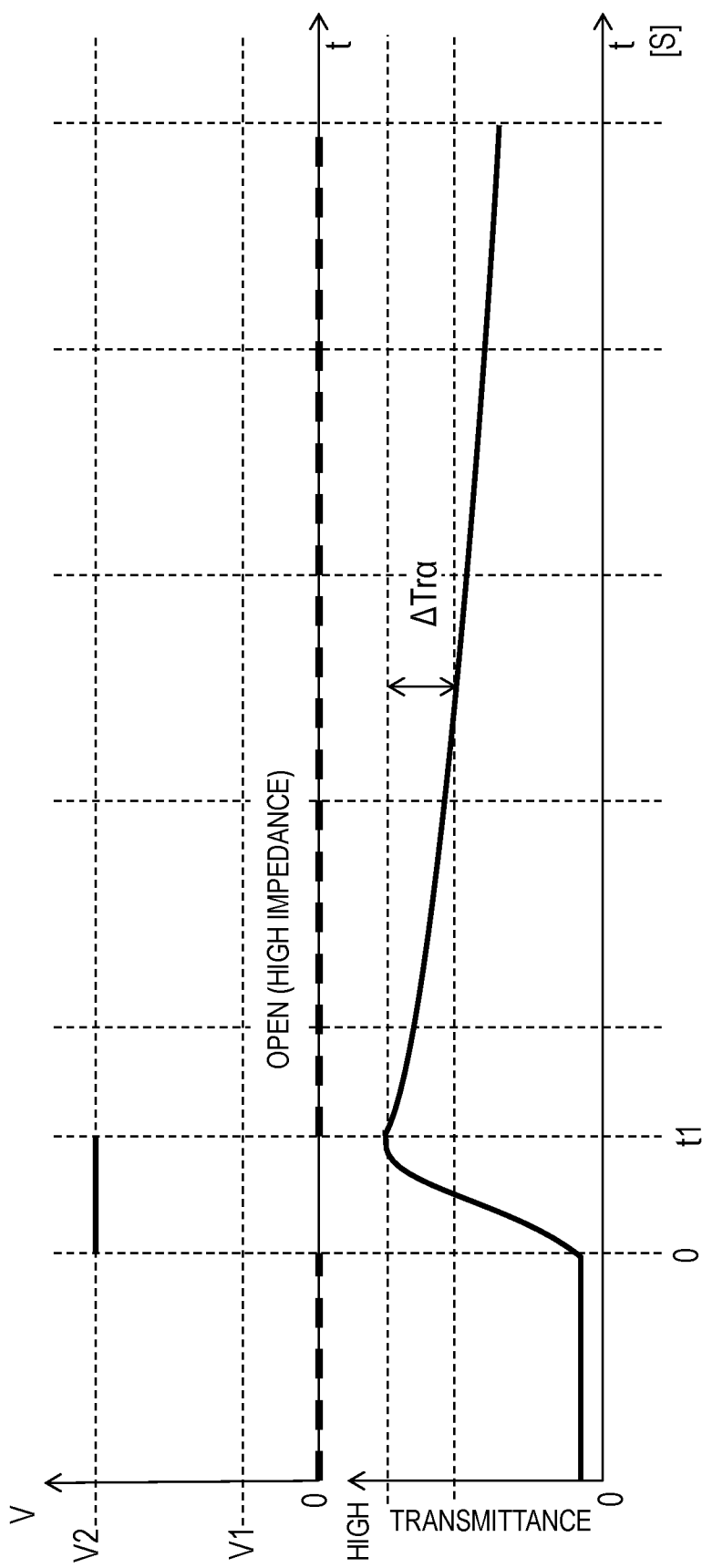
FIG. 35 is a graph indicating the result of measuring the transient change of the transmittance at the angle α measured in FIG. 7A corresponding to the change in the voltage applied to the light beam direction control element according to the seventh embodiment.

FIG. 35 provides transient response in transmittance in the case where the same voltage as the transition voltage V2 applied in FIGS. 33 and 34 is applied and thereafter, the transparent conductive films 12 and 15 are open-circuited. As indicated in FIG. 35, it was revealed that the decrease in transmittance after the time t1 at which the transparent conductive films 12 and 15 are open-circuited is gentle and the time until the variation in transmittance exceeds ΔTrα is longer than that in FIG. 33. This means that, depending on the characteristics of the light beam direction control element 1, a wide viewing angle state can be maintained for a certain period even if the transparent conductive films 12 and 15 are open-circuited after application of a voltage for the wide viewing angle state.

However, as illustrated in FIG. 35, if the transparent conductive films 12 and 15 with the transition voltage V2 applied to change the light beam direction control element 1 to a wide viewing angle state are kept open-circuited after the time t1, the transmittance keeps decreasing so that the variation exceeds ΔTrα and eventually, the light beam direction control element 1 becomes a narrow viewing angle state.

Figure 36:
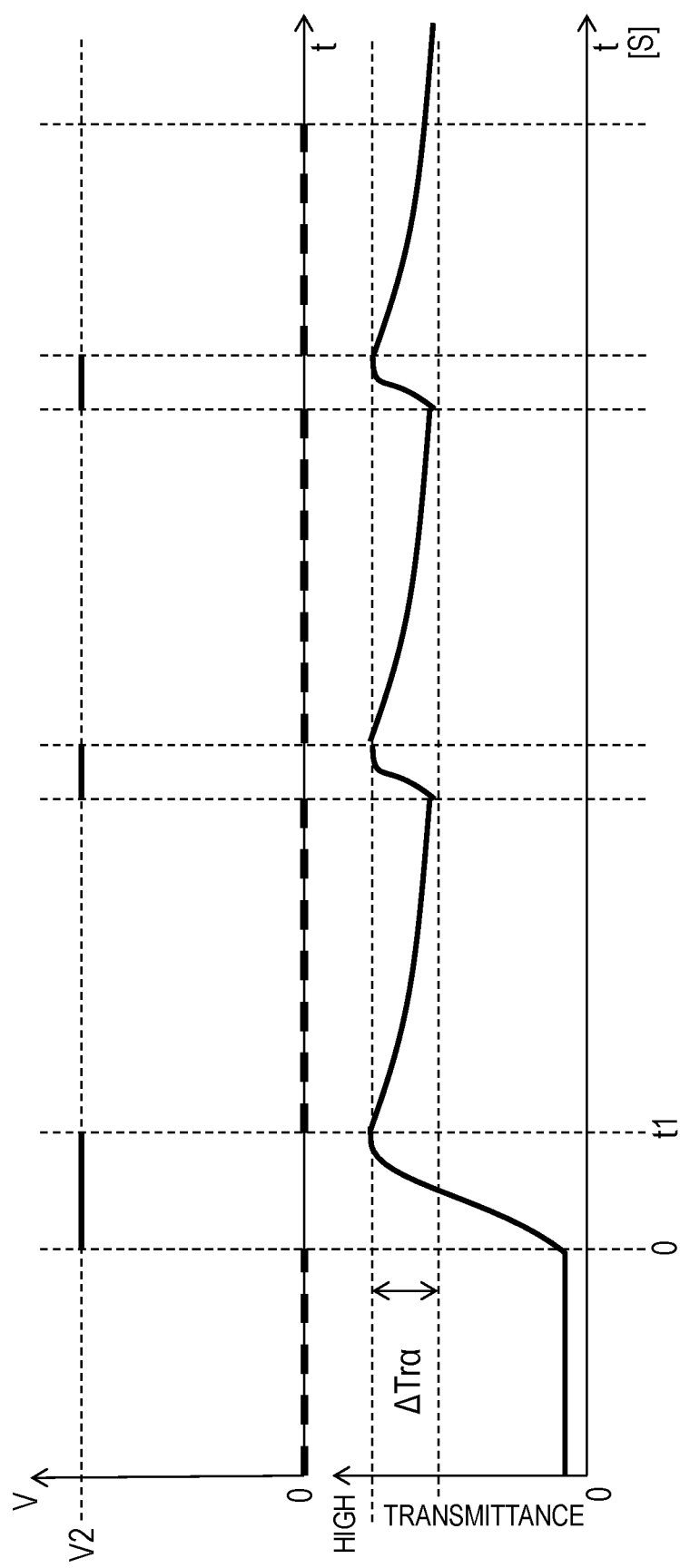
FIG. 36 is a graph indicating the result of measuring the transient change of the transmittance at the angle α measured in FIG. 7A corresponding to the change in the voltage applied to the light beam direction control element according to the seventh embodiment.

In view of the above, this embodiment open-circuits the transparent conductive films 12 and 15 at the time t1 and thereafter, applies a transition voltage V2 again before the transmittance decreases by ΔTrα, as illustrated in FIG. 36. The time (cycle) until re-application of the transition voltage V2 and the time (period) in which the transition voltage V2 is to be applied can be determined through measurement.

Figure 37:
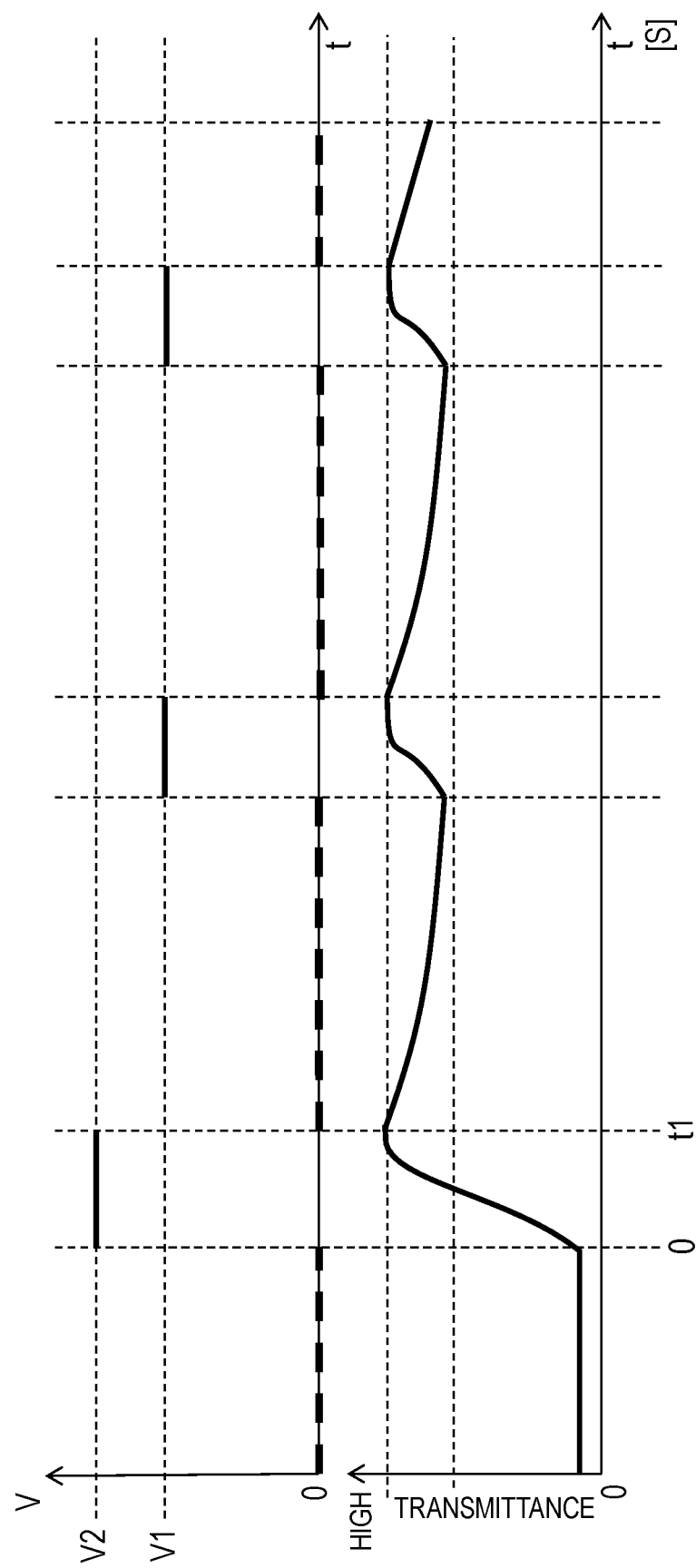
FIG. 37 is a graph indicating the result of measuring the transient change of the transmittance at the angle α measured in FIG. 7A corresponding to the change in the voltage applied to the light beam direction control element according to the seventh embodiment.

Alternatively, as illustrated in FIG. 37, the maintenance voltage V1 lower than the transition voltage V2 can be applied before the transmittance decreases by ΔTrα after the transparent conductive films 12 and 15 are open-circuited. The voltage appropriate for the maintenance voltage V1 and the period appropriate for applying the maintenance voltage V1 can be determined through measurement.

Since the open-circuit state is provided after application of the transition voltage V2, low power consumption is achieved to maintain a wide viewing angle state.

As an example of the control circuit 4 in the seventh embodiment, the control circuit 4 in the sixth embodiment illustrated in FIG. 22 can be used.

As described above, the seventh embodiment can quickly change the light beam direction control element 1 from a narrow viewing angle state to a wide viewing angle state and further, maintain the wide viewing angle state with low power consumption.

In changing from a narrow viewing angle state to a wide viewing angle state, the control device 2 may apply different voltages to the transparent conductive films 12 and 15 depending on the elapsed time of the narrow viewing angle state.

Eighth Embodiment

Figure 24:
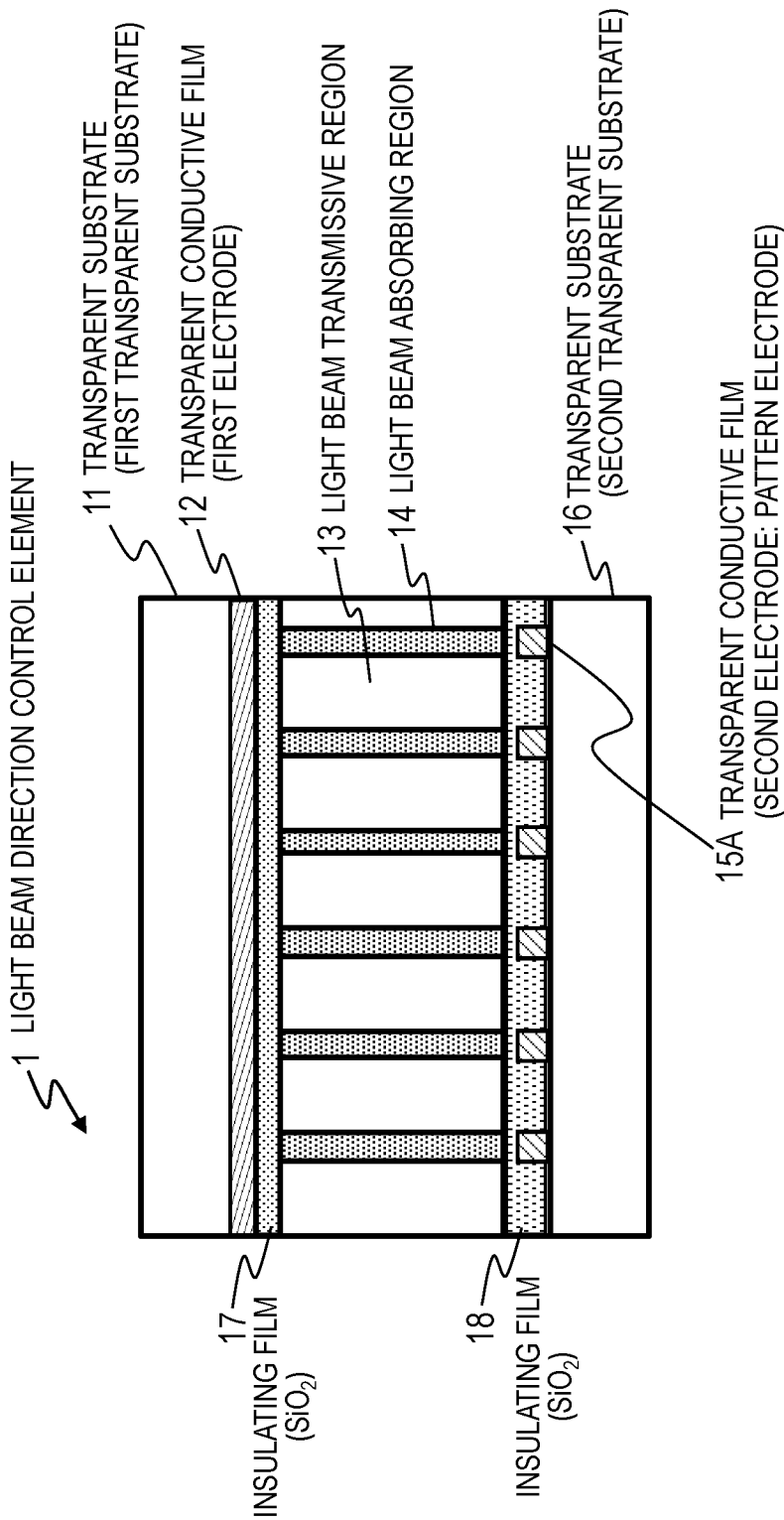
FIG. 24 illustrates a cross-sectional structure of a light beam direction control element according to an eighth embodiment.

FIG. 24 illustrates a cross-sectional structure of a light beam direction control element 1 in the eighth embodiment. In the eighth embodiment, the transparent conductive film 15 in the light beam direction control element 1 is a pattern electrode. The remaining configuration is the same as the configuration in the first embodiment.

A transparent conductive film 15A is provided on the transparent substrate (second transparent substrate) 16 in the regions opposed to the light beam absorbing regions 14. Between the light beam absorbing regions 14 and the transparent conductive film 15A, an insulating film 18 is provided. The transparent conductive film 15A is a pattern electrode; an example of the pattern shape of the transparent conductive film 15A is identical to the pattern shape of the light beam absorbing regions 14 in the planar view. The appropriate film thickness of the transparent conductive film 15A is in a range from 10 nm to 1000 nm and can be 300 nm, for example. The transparent conductive film 15A in the form of a pattern electrode has a smaller area, achieving better transmittance of the light beam direction control element 1.

The transmittance of the transparent conductive film 15A can be lower than the transmittance of the transparent conductive film 12. The transparent conductive film 15A can be replaced by a pattern electrode made of a light beam reflective metal. The transparent conductive film 12 can be a pattern electrode having a pattern shape corresponding to the pattern shape of the light beam absorbing regions 14, like the transparent conductive film 15A. The light beam direction control element 1 can include the unseparated planar transparent conductive film 15 in the first embodiment and a transparent conductive film 12 of a pattern electrode. In this configuration, the transmittance of the transparent conductive film 12 can be lower than the transparent conductive film 15. The transparent conductive film 12 can be replaced by a pattern electrode made of a light beam reflective metal. The insulating films 17 and 18 can be omitted from the configuration in FIG. 24.

Ninth Embodiment

As illustrated in FIGS. 3A and 3B, the light beam direction control element 1 of this disclosure achieves its wide viewing angle state with the electrophoretic particles 140 collected by application of an electric field and achieves its narrow viewing angle state with the electrophoretic particles 140 dispersed under no electric field. It has been described in the first embodiment that the most stable state is the state in which the density of the electrophoretic particles 140 are macroscopically uniform. However, the electrophoretic particles 140 behave intricately until reaching the stable state because of the hydrodynamic effects or electrostatic interaction.

Figure 25:
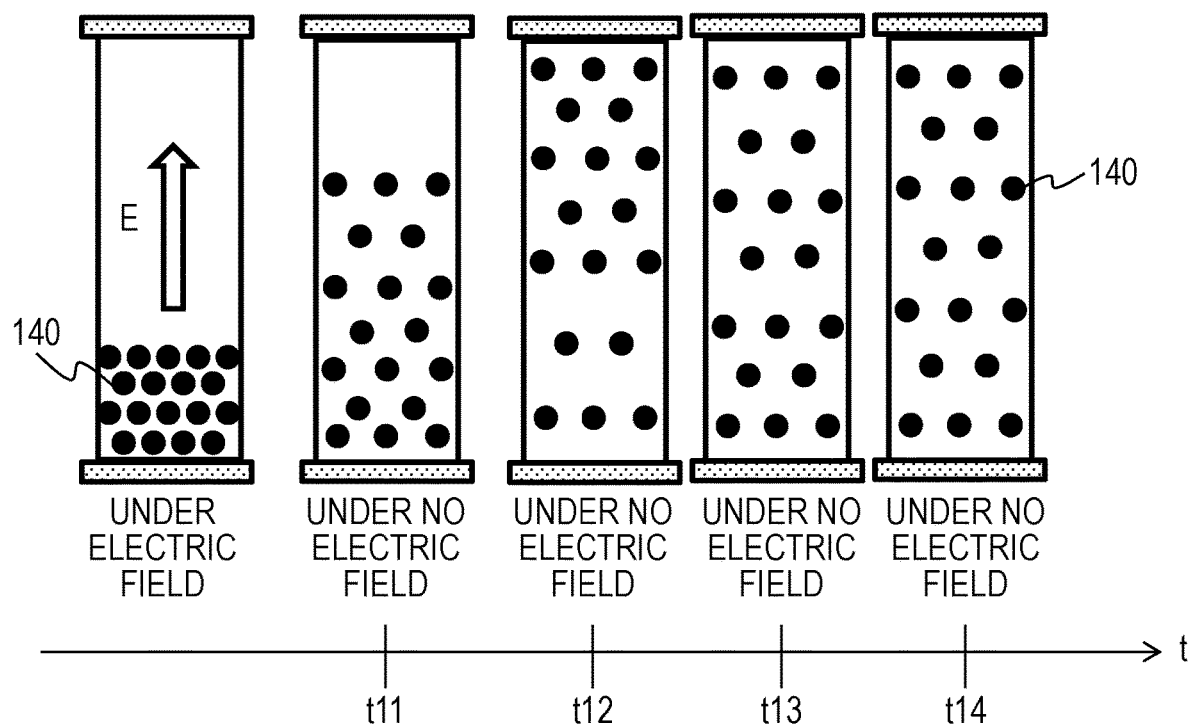
FIG. 25 is a diagram illustrating an example of a change in electrophoretic particles according to a ninth embodiment.

Presuming the damped oscillation behavior of the electrophoretic particles 140 as a simple model, the behavior of the electrophoretic particles 140 is illustrated in FIG. 25. Upon vanishment of the electric field applied across the electrodes, the electrophoretic particles 140 start diffusing toward the electrode opposite from the electrode around which the electrophoretic particles 140 have been collected (t11). Subsequently, the density of the electrophoretic particles 140 becomes higher in the area closer to the opposite electrode than the area closer to the original electrode. For this reason, some electrophoretic particles 140 move toward the original electrode because of the repulsion (t12).

Some time later, even if all electrophoretic particles 140 look like uniformly distributed, it can be considered that the individual electrophoretic particles 140 are oscillating (t13, t14). In other words, even if the angular distribution of the transmitted light beam has become unchanged (a narrow viewing angle state) under the condition of no electric field, it can be considered that each electrophoretic particle 140 keeps vibrating minutely. The phenomenon illustrated in FIG. 25 can be observed in the other embodiments.

Accordingly, in re-applying an electric field to change the electrophoretic particles 140 (light beam direction control element 1) into a wide viewing angle state, the response time is different depending on the magnitude of the vibration. Specifically, an electrophoretic particle 140 moving at least a little moves faster than a completely static electrophoretic particle 140. That is to say, in changing the light beam direction control element 1 that has stayed in a narrow viewing angle state for a long time to a wide viewing angle state, applying the same voltage for the same time as those to change the light beam direction control element 1 that has been in a narrow viewing angle state for a short time to a wide viewing angle state cannot attain the desired transmittance.

To avoid this situation, the driving to achieve a wide viewing angle state needs to be corrected depending on the period (elapsed time) under a narrow viewing angle state. This embodiment measures the elapsed time since entering the narrow viewing angle state and applies a voltage in accordance with the elapsed time to prevent insufficient transmittance.

Figure 26:
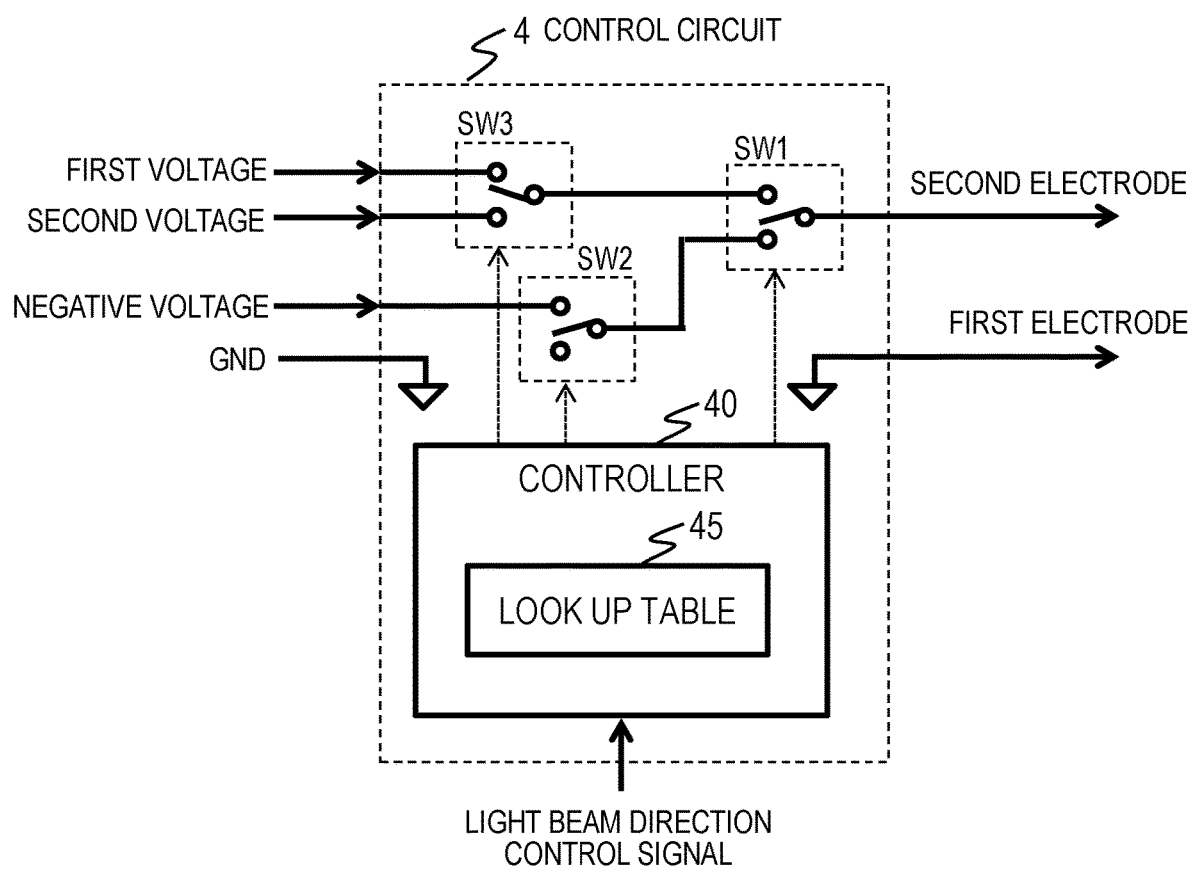
FIG. 26 is a block diagram illustrating an example of the control circuit according to the ninth embodiment.

FIG. 26 is a block diagram illustrating an example of the control circuit 4 in the ninth embodiment. The controller 40 includes a look-up table (LUT) 45. The remaining is the same as the configuration example in FIG. 22. The controller 40 counts the elapsed time ET under a narrow viewing angle state with a built-in timer, consults the LUT 45, and acquires a voltage associated with the elapsed time ET. The controller 40 corrects the voltage to be applied across the first electrode and the second electrode in accordance with the voltage acquired from the LUT 45 to maintain the desired transmittance.

Figure 27:
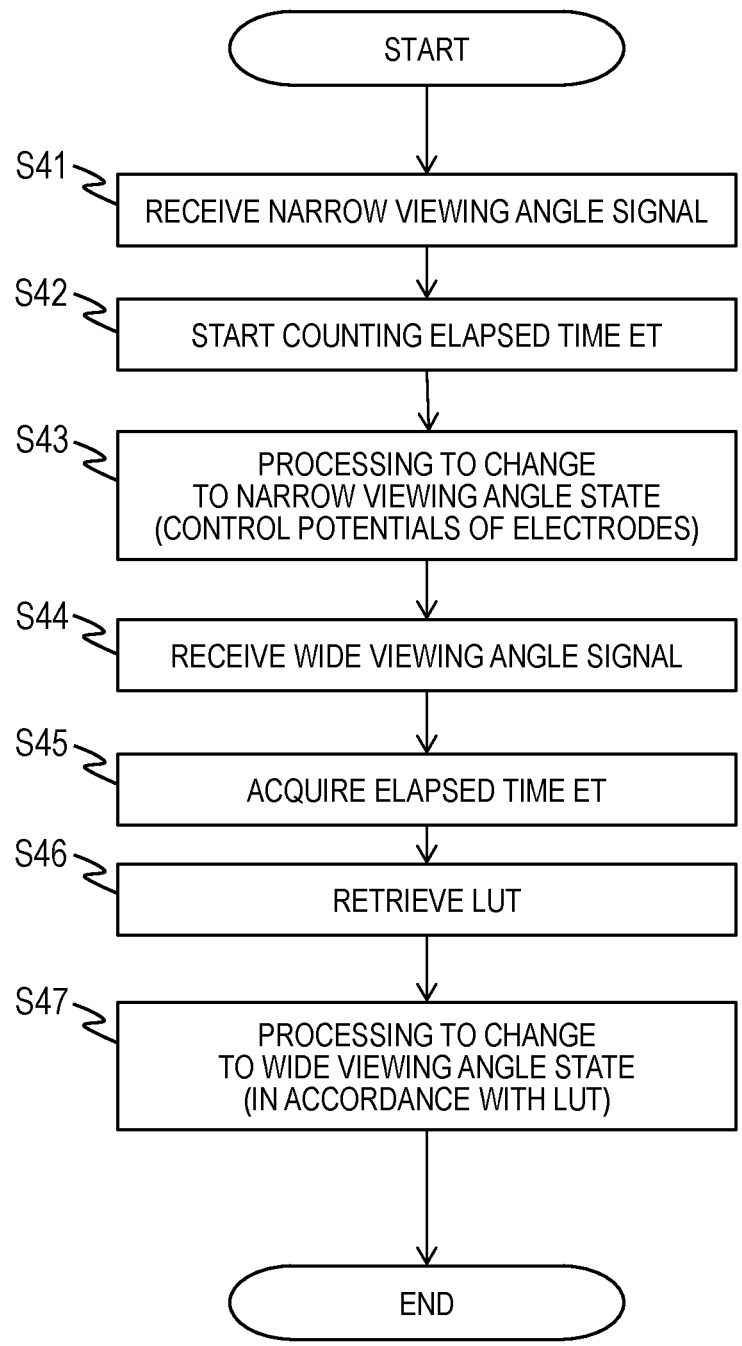
FIG. 27 is a flowchart an example of control processing in response to a narrow viewing angle signal according to the ninth embodiment.

FIG. 27 is a flowchart illustrating an example of the control in the ninth embodiment. First, at Step S41, the controller 40 receives a narrow viewing angle signal. Next, at Step S42, the controller 40 starts counting the elapsed time ET since the reception of the narrow viewing angle signal.

At Step S43, the controller controls the switches SW1 and SW2 to open-circuit the transparent conductive film (second electrode) 15 and the transparent conductive film (first electrode) 12, like in the first embodiment. In response to this change of open-circuiting the transparent conductive films 12 and 15, the transmittance at the angle α gradually and slowly decreases. It should be noted that the control for the change to a narrow viewing angle state is not limited to the control in first embodiment; the control described in the third, fourth, or fifth embodiment is applicable.

At Step S44, the controller 40 receives a wide viewing angle signal. At Step S45, the controller 40 acquires the elapsed time ET. At Step S46, the controller 40 acquires the first voltage to be applied and the second voltage to be applied associated with the elapsed time ET with reference to the LUT 45 illustrated in FIG. 28.

At Step S47, the controller 40 applies the second voltage and the first voltage acquired in the foregoing step across the transparent conductive film (second electrode) 15 and the transparent conductive film (first electrode) 12 as will be described later. This processing enables the controller 40 to apply different voltages across the transparent conductive films 12 and 15 depending on the elapsed time ET under a narrow viewing angle state.

Figure 29:
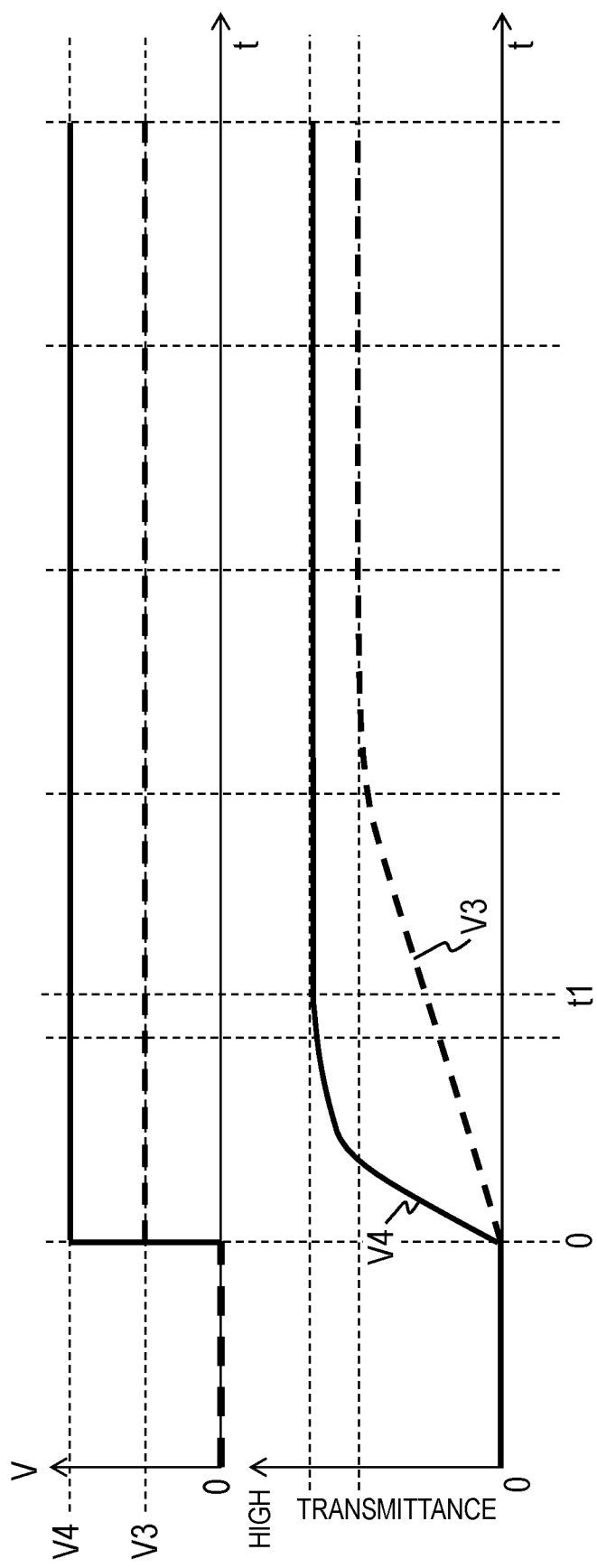
FIG. 29 is a graph indicating the result of measuring the transient change of the transmittance at the angle α measured in FIG. 7A corresponding to the change in the voltage applied to the light beam direction control element according to the ninth embodiment.

The LUT 45 is prepared to include voltages associated with elapsed times ET since entering a narrow viewing angle state. FIG. 28 is an example of the LUT 45. As illustrated in FIG. 28, the LUT 45 stores the second voltages and the first voltages to be applied depending on the elapsed time ET. The LUT 45 can be created through measurement of the response characteristic of the light beam direction control element 1. FIG. 29 provides graphs representing results of measurement of transition variation in transmittance when different voltages were applied to the light beam direction control element 1 at a given elapsed time ET. The broken line represents the transition variation when a voltage V3 was applied and the solid line represents the transition variation when a voltage V4 higher than the voltage V3 was applied. In the case of applied voltage of V3, sufficient transmittance was not attained at the time t1 or any time later than the time t1. However, in the case of applied voltage of V4, the desired transmittance was attained at the time t1. Accordingly, the voltage to be applied for this elapsed time ET can be determined to be V4. In this way, the LUT 45 is prepared through measurement of transition variation in transmittance under each elapsed time ET. Meanwhile, the control circuit 4 can use the voltage V3 as the first voltage and the voltage V4 higher than the voltage V3 as the second voltage and switches the voltage to be applied to the transparent conductive film (second electrode) 15 from first voltage to the second voltage, like in the foregoing embodiment.

That is to say, the applied voltage can be changed from the voltage V4 to the voltage V3 at the time t1. Since the voltage to maintain a wide viewing angle state is lower, low power consumption is achieved. In the case where the time t1 is employed as the time to change the applied voltage from the voltage V4 to the voltage V3, the value of the time t1 can be changed depending on the elapsed time ET under a narrow viewing angle state. In this case, the LUT 45 can be configured to include the values for the time t1 associated with elapsed times ET under a narrow viewing angle state.

In the above-described example, the controller 40 applies one voltage selected from two voltages V3 and V4. Unlike this, the controller 40 may apply one voltage selected from three or more voltages in accordance with the elapsed time ET under a narrow viewing angle state. Such a configuration achieves finer correction.

For example, the LUT 45 provides three or more voltages for each elapsed time ET under a narrow viewing angle state. The switch SW3 in the example of FIG. 26 is configured to select one from three or more inputs. The controller 40 determines a voltage for an elapsed time ET under a narrow viewing angle state with reference to the LUT 45 and controls the switch SW3 to select the determined voltage.

Tenth Embodiment

This embodiment performs correction of the driving in accordance with the elapsed time under a narrow viewing angle state, like the ninth embodiment. This embodiment applies alternating voltage for a predetermined time when the desired transmittance is not attained even though a predetermined voltage is applied.

In FIG. 26, a look-up table (LUT) 45 is prepared in the controller 40. The LUT 45 specifies time t1 and time t2 for specifying the period to apply alternating voltage and the voltage to be applied. The LUT 45 specifies alternating voltage for each elapsed time under a narrow viewing angle state in advance. Taking an example of FIG. 26, the first voltage in the control circuit 4 is to be considered as +V5 and the negative voltage as −V5. The controller 40 counts the elapsed time under a narrow viewing angle state with a built-in timer. In the case where the counted elapsed time is associated with alternating voltage at a value V5 in the LUT 45, the controller 40 controls the voltage as specified in the LUT 45.

In the case where the voltage to be applied is V5, this operation applies potentials of ±V5 for the period from the time t1 to time t2. As a result, the electrophoretic particles 140 disperse to attain the predetermined transmittance.

Figure 30:
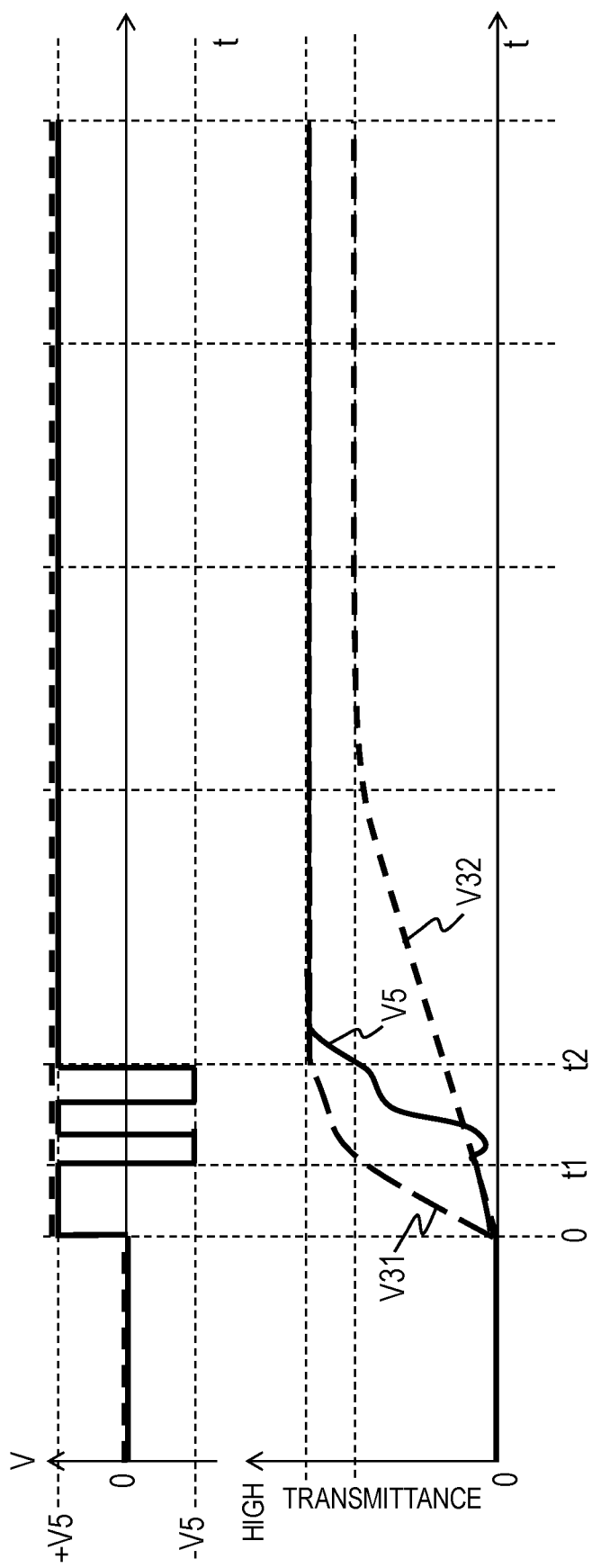
FIG. 30 is a graph indicating the result of measuring the transient change of the transmittance at the angle α measured in FIG. 7A corresponding to the change in the voltage applied to the light beam direction control element according to a tenth embodiment.

FIG. 30 provides graphs representing results of measurement of transition variations in transmittance when different voltages were applied to the light beam direction control element 1 in this embodiment. The long broken line V31 represents the transition variation when the voltage V5 (DC voltage) was applied in the case where the elapsed time under a narrow viewing angle state was short. The short broken line V32 represents the transition variation when the voltage V5 (DC voltage) was applied in the case where the elapsed time under a narrow viewing angle state was long. The solid line V5 represents the transition variation when alternating voltage of V5 was applied for a specific period (from t1 to t2) and the voltage V5 (DC voltage) was applied from the time t2 in the case where the elapsed time under a narrow viewing angle state was long.

When the elapsed time under a narrow viewing angle state is short, sufficient transmittance is attained at the time t2 as indicated by the long broken line V31. However, when the elapsed time under a narrow viewing angle state is long, the transmittance does not increase sufficiently even though the voltage is applied, as indicated by the short broken line V32.

To cope with this situation, it was revealed that applying alternating voltage including a negative voltage at the time t1 leads to better transmittance. The electrophoretic particles move in the reverse direction to the direction until the time t1, so that the transmittance once decreases. This operation contributes to moving the electrophoretic particles easily; the electrophoretic particles can move faster in response to the following application of a positive voltage to expedite the increase in transmittance. The application of alternating voltage significantly improves the response characteristic. The frequency of the alternating voltage in the drawing is merely an example and any frequency can be selected as appropriate.

As a result of applying alternating voltage, a desired transmittance is attained at the time t2, although the sufficient transmittance is not attained at the time t2 or later than the time t2 in the case where the applied voltage was fixed at V5.

Eleventh Embodiment

The foregoing embodiments are to address the problem that the response characteristic of the light beam direction control element 1 changes with the elapsed time under a narrow viewing angle state, as described in the embodiments. The response characteristic of the light beam direction control element 1 changes with temperature. This embodiment corrects the driving depending on the environmental temperature.

The motion of an electrophoretic particle 140 in an electric field depends on the mobility (electrophoretic mobility μ).

The motion of an electrophoretic particle (charged particle) 140 having an electric charge amount q is accelerated by receiving a force qE from an electric field E but eventually, becomes uniform motion because of the balance with the viscous resistance of the liquid (dispersion medium 141). When a charged particle having a radius a moves in a liquid having a viscosity η at a velocity v, it receives a resistive force of 6πηav. The value obtained by dividing the velocity v by E is the electrophoretic mobility μ. Accordingly, the following formulae (1) to (3) can be obtained:

$$qE = 6\pi\eta av \quad (1)$$

$$v = \frac{qE}{6\pi\eta a} \quad (2)$$

$$\mu = \frac{v}{E} = \frac{q}{6\pi\eta a} \quad (3)$$

The viscosity of the liquid depends on the temperature of the liquid. Accordingly, the mobility of an electrophoretic particle 140 has temperature dependency.

Figure 31:
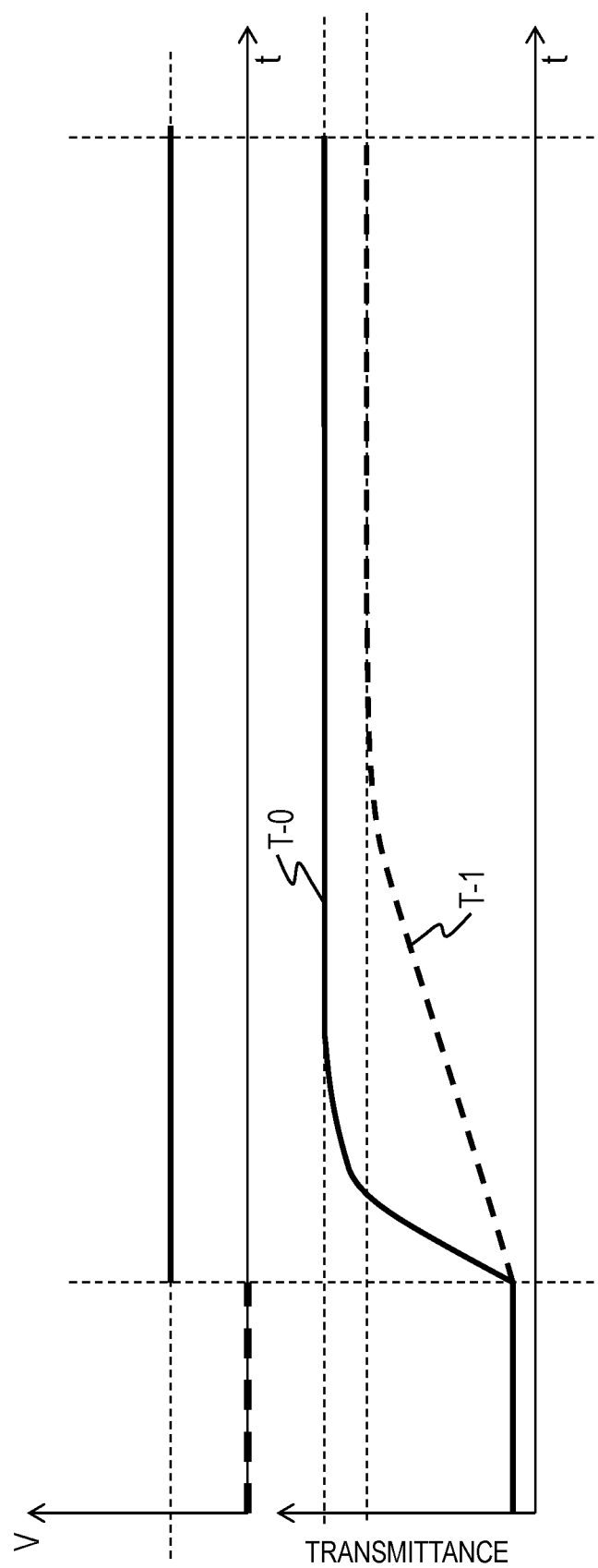
FIG. 31 is a graph indicating the result of measuring the transient change of the transmittance at the angle α measured in FIG. 7A corresponding to the change in the voltage applied to the light beam direction control element according to an eleventh embodiment.
Figure 32:
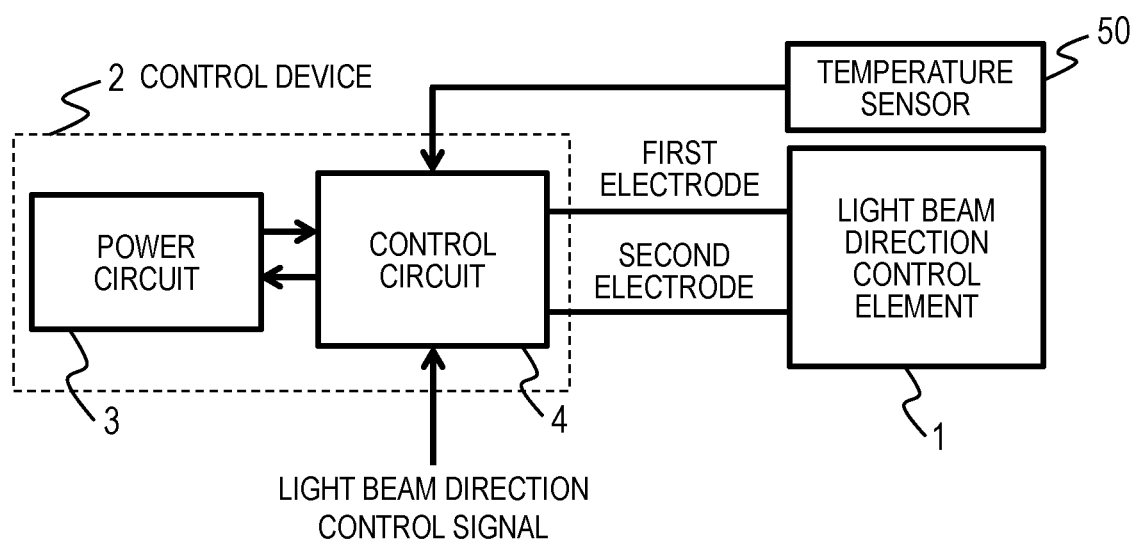
FIG. 32 is a block diagram illustrating an example of the configuration of the control circuit according to the eleventh embodiment.

As indicated in FIG. 31, the transmittance characteristic change from the solid line (T-0) to the broken line (T-1) with a drop of the environmental temperature, even though the applied voltage is unchanged. The light beam direction control device in this embodiment includes at least one temperature sensor 50 for detecting the temperature of the light beam direction control element 1, as illustrated in FIG. 32.

The temperature information detected by the temperature sensor 50 is input to the control circuit 4. The controller 40 of the control circuit 4 in FIG. 32 has a look-up table (LUT) 45. The controller 40 consults the LUT 45 with the temperature acquired from the temperature sensor 50, retrieves the voltage associated with the temperature, and corrects the voltage to be applied across the transparent conductive film (first electrode) 12 and the transparent conductive film (second electrode) 15 with the retrieved voltage to correct the transmittance. The LUT 45 associates a lower temperature with a higher voltage to be applied.

The correction can use the voltage like in the ninth embodiment or the alternating voltage like in the tenth embodiment. An LUT 45 including combinations of a temperature and an elapsed time associated with voltages may be prepared. The control circuit 4 corrects the voltage to be applied across the transparent conductive film (first electrode) 12 and the transparent conductive film (second electrode) 15 depending on the temperature measured by the temperature sensor 50 to compensate for the insufficiency in transmittance characteristic of the light beam direction control element 1.

SUPPLEMENTAL

The foregoing first to eleventh embodiment can employ glass, polyethylene terephthalate (PET), polycarbonate (PC), or polyethylene naphthalate (PEN) for the transparent substrates 11 and 16.

The first to eleventh embodiment can employ ITO, ZnO, or IGZO having an appropriate thickness within a range from 10 nm to 1000 nm, for example, 100 nm, for the transparent conductive films 12 and 15.

The light beam direction control element 1 described in the foregoing embodiments is applicable to not only a liquid crystal display device but also other types of display devices such as organic EL display, inorganic EL display, LED display, or plasma display as a display panel 5 illustrated in FIG. 4A. The light beam direction control element 1 can be installed in various ways, such as bonding it directly on the surface of a display panel 5, embedding it in a display device, and interposing it between a display panel and a backlight.

The foregoing third to eleventh embodiments can employ a light beam direction control element 1 including insulating films 17 and 18 sandwiching the light beam transmissive regions 13 and the light beam absorbing regions 14 as illustrated in FIG. 10 in the second embodiment.

The foregoing first to fifth embodiment can incorporate the seventh embodiment so that the control device 2 open-circuits the transparent conductive films 12 and 15 (into a high-impedance state) after applying the transition voltage V2 to change the light beam direction control element 1 from a narrow viewing angle state to a wide viewing angle state.

The light beam direction control element 1 can have a hard coat layer for preventing flaws or an anti-reflection layer for preventing reflection of the external light beam on its surface. The light beam direction control element 1 in this disclosure is applicable widely to portable information processing terminals such as mobile phones, notebook computers, feature phones, smartphones, tablet terminals, and PDAs.

As set forth above, embodiments of this disclosure have been described; however, this disclosure is not limited to the foregoing embodiments. Those skilled in the art can easily modify, add, or convert each element in the foregoing embodiments within the scope of this disclosure. A part of the configuration of one embodiment can be replaced with a configuration of another embodiment or a configuration of an embodiment can be incorporated into a configuration of another embodiment.

What is claimed is:

1. A light beam direction control device comprising:
   a first transparent substrate and a second transparent substrate disposed in such a manner that a main face of the first transparent substrate and a main face the second transparent substrate are opposed to each other;
   a first transparent conductive film and a second transparent conductive film provided on the main face of the first transparent substrate and the main face of the second transparent substrate, respectively;
   a first electrode and a second electrode electrically connected with the first transparent conductive film and the second transparent conductive film, respectively;
   a plurality of light beam transmissive regions disposed on the first transparent substrate and the second transparent substrate;
   light beam absorbing regions each disposed between light beam transmissive regions adjacent to each other and including light beam blocking electrophoretic particles and transmissive dispersion medium, the electrophoretic particles having charges of a specific polarity; and
   a control circuit configured to control potential difference between the first transparent conductive film and the second transparent conductive film,
   wherein the control circuit is configured to:
      change a dispersion state of the electrophoretic particles by adjusting the potential difference to change a range of outgoing direction of light beam that passes through the light beam transmissive regions and the dispersion medium; and
      apply a predetermined voltage across the first electrode and the second electrode to change the range of outgoing direction to a wide range, electrically open-circuit the first electrode and the second electrode to change the range of outgoing direction to a narrow range, and keep the open-circuited state to maintain the narrow range of outgoing direction.

2. The light beam direction control device according to claim 1, wherein the control circuit is configured to keep applying the predetermined voltage to maintain the wide range of outgoing direction.

3. The light beam direction control device according to claim 1, wherein the control circuit is configured to provide a period in which the first electrode and the second electrode are short-circuited to change the range of outgoing direction to the narrow range.

4. The light beam direction control device according to claim 1, wherein the control circuit is configured to provide a period in which the control circuit applies a voltage having a reverse-polarity from a polarity of the predetermined voltage across the first electrode and the second electrode to change the range of outgoing direction to a narrow range.

5. The light beam direction control device according to claim 4, wherein the control circuit is configured to provide a period in which the first electrode and the second electrode are short-circuited after the period in which the control circuit applies the voltage having the reverse-polarity.

6. The light beam direction control device according to claim 1, further comprising:
   a first insulating film between the main face of the first transparent substrate opposed to the main face of the second transparent substrate and the light beam absorbing regions; and
   a second insulating film between the main face of the second transparent substrate opposed to the main face of the first transparent substrate and the light beam absorbing regions.

7. The light beam direction control device according to claim 6, wherein at least either the first transparent conductive film or the second transparent conductive film has a pattern shape corresponding to a pattern shape of the light beam absorbing regions.

8. A light beam direction control device comprising:
   a first transparent substrate and a second transparent substrate disposed in such a manner that a main face of the first transparent substrate and a main face the second transparent substrate are opposed to each other;
   a first transparent conductive film and a second transparent conductive film provided on the main face of the first transparent substrate and the main face of the second transparent substrate, respectively;
   a first electrode and a second electrode electrically connected with the first transparent conductive film and the second transparent conductive film, respectively;
   a plurality of light beam transmissive regions disposed on the first transparent substrate and the second transparent substrate;
   light beam absorbing regions each disposed between light beam transmissive regions adjacent to each other and including light beam blocking electrophoretic particles and transmissive dispersion medium, the electrophoretic particles having charges of a specific polarity; and
   a control circuit configured to control potential difference between the first transparent conductive film and the second transparent conductive film,
   wherein the control circuit is configured to:
      change a dispersion state of the electrophoretic particles by adjusting the potential difference to change a range of outgoing direction of light beam that passes through the light beam transmissive regions and the dispersion medium; and apply a second voltage across the first electrode and the second electrode to change the range of outgoing direction to a wide range, and keep applying a first voltage lower than the second voltage to maintain the wide range of outgoing direction.

9. A light beam direction control device comprising:
a first transparent substrate and a second transparent substrate disposed in such a manner that a main face of the first transparent substrate and a main face the second transparent substrate are opposed to each other;
a first transparent conductive film and a second transparent conductive film provided on the main face of the first transparent substrate and the main face of the second transparent substrate, respectively;
a first electrode and a second electrode electrically connected with the first transparent conductive film and the second transparent conductive film, respectively;
a plurality of light beam transmissive regions disposed on the first transparent substrate and the second transparent substrate;
light beam absorbing regions each disposed between light beam transmissive regions adjacent to each other and including light beam blocking electrophoretic particles and transmissive dispersion medium, the electrophoretic particles having charges of a specific polarity; and
a control circuit configured to control potential difference between the first transparent conductive film and the second transparent conductive film,
wherein the control circuit is configured to:
change a dispersion state of the electrophoretic particles by adjusting the potential difference to change a range of outgoing direction of light beam that passes through the light beam transmissive regions and the dispersion medium; and
apply a voltage across the first electrode and the second electrode to change the range of outgoing direction to a wide range, and electrically open-circuit the first electrode and the second electrode after applying the voltage across the first electrode and the second electrode to maintain the wide range of outgoing direction.

10. The light beam direction control device according to claim 9, wherein the control circuit is configured to apply the voltage again across the first electrode and the second electrode for a predetermined time after maintaining the wide range of outgoing direction by electrically open-circuiting the first electrode and the second electrode for a predetermined time, and thereafter, repeat the open-circuiting the first electrode and the second electrode and the applying the voltage across the first electrode and the second electrode to maintain the wide range of outgoing direction.

11. The light beam direction control device according to claim 10, wherein the control circuit is configured to apply a voltage lower than the voltage across the first electrode and the second electrode for a predetermined time after maintaining the wide range of outgoing direction by electrically open-circuiting the first electrode and the second electrode for a predetermined time, and thereafter, repeat the open-circuiting the first electrode and the second electrode and the applying the voltage lower than the voltage across the first electrode and the second electrode to maintain the wide range of outgoing direction.

12. A light beam direction control device comprising:
a first transparent substrate and a second transparent substrate disposed in such a manner that a main face of the first transparent substrate and a main face the second transparent substrate are opposed to each other;
a first transparent conductive film and a second transparent conductive film provided on the main face of the first transparent substrate and the main face of the second transparent substrate, respectively;
a first electrode and a second electrode electrically connected with the first transparent conductive film and the second transparent conductive film, respectively;
a plurality of light beam transmissive regions disposed on the first transparent substrate and the second transparent substrate;
light beam absorbing regions each disposed between light beam transmissive regions adjacent to each other and including light beam blocking electrophoretic particles and transmissive dispersion medium, the electrophoretic particles having charges of a specific polarity; and
a control circuit configured to control potential difference between the first transparent conductive film and the second transparent conductive film,
wherein the control circuit is configured to:
change a dispersion state of the electrophoretic particles by adjusting the potential difference to change a range of outgoing direction of light beam that passes through the light beam transmissive regions and the dispersion medium; and
change voltage to be applied across the first electrode and the second electrode depending on elapsed time in which a narrow range of outgoing direction is maintained to change the range of outgoing direction to a wide range.

13. The light beam direction control device according to claim 12, wherein the voltage to be applied across the first electrode and the second electrode includes voltage having a reversed polarity or alternating voltage.

14. A light beam direction control device comprising:
a first transparent substrate and a second transparent substrate disposed in such a manner that a main face of the first transparent substrate and a main face the second transparent substrate are opposed to each other;
a first transparent conductive film and a second transparent conductive film provided on the main face of the first transparent substrate and the main face of the second transparent substrate, respectively;
a first electrode and a second electrode electrically connected with the first transparent conductive film and the second transparent conductive film, respectively;
a plurality of light beam transmissive regions disposed on the first transparent substrate and the second transparent substrate;
light beam absorbing regions each disposed between light beam transmissive regions adjacent to each other and including light beam blocking electrophoretic particles and transmissive dispersion medium, the electrophoretic particles having charges of a specific polarity; and
a control circuit configured to control potential difference between the first transparent conductive film and the second transparent conductive film,
wherein the control circuit includes a temperature sensor configured to measure environmental temperature, and the control circuit is configured to:
change a dispersion state of the electrophoretic particles by adjusting the potential difference to change a range of outgoing direction of light beam that passes through the light beam transmissive regions and the dispersion medium; and
change voltage to be applied across the first electrode and the second electrode depending on measured environmental temperature to change the range of outgoing direction to a wide range.

15. A driving method for a light beam direction control element,
the light beam direction control element including:
a first transparent substrate and a second transparent substrate disposed in such a manner that a main face of the first transparent substrate and a main face the second transparent substrate are opposed to each other;
a first transparent conductive film and a second transparent conductive film provided on the main face of the first transparent substrate and the main face of the second transparent substrate, respectively;
a first electrode and a second electrode electrically connected with the first transparent conductive film and the second transparent conductive film, respectively;
a plurality of light beam transmissive regions disposed on the first transparent substrate and the second transparent substrate;
light beam absorbing regions each disposed between light beam transmissive regions adjacent to each other and including light beam blocking electrophoretic particles and transmissive dispersion medium, the electrophoretic particles having charges of a specific polarity; and
a control circuit configured to control potential difference between the first transparent conductive film and the second transparent conductive film, and
the method comprising:
changing, by the control circuit, a dispersion state of the electrophoretic particles by adjusting the potential difference to change a range of outgoing direction of light beam that passes through the light beam transmissive regions and the dispersion medium;
applying, by the controller, a predetermined voltage across the first electrode and the second electrode to change the range of outgoing direction to a wide range;
electrically open-circuiting, by the controller, the first electrode and the second electrode to change the range of outgoing direction to a narrow range; and
keeping, by the controller, the open-circuited state to maintain the narrow range of outgoing direction.

16. The driving method for a light beam direction control element according to claim 15, further comprising providing, by the control circuit, a period in which the first electrode and the second electrode are short-circuited to change the range of outgoing direction to the narrow range.

17. The driving method for a light beam direction control element according to claim 15, further comprising providing, by the control circuit, a period in which a voltage having a reverse-polarity from a polarity of the predetermined voltage is applied across the first electrode and the second electrode to change the range of outgoing direction to a narrow range.

18. A driving method for a light beam direction control element,
the light beam direction control element including:
a first transparent substrate and a second transparent substrate disposed in such a manner that a main face of the first transparent substrate and a main face the second transparent substrate are opposed to each other;
a first transparent conductive film and a second transparent conductive film provided on the main face of the first transparent substrate and the main face of the second transparent substrate, respectively;
a first electrode and a second electrode electrically connected with the first transparent conductive film and the second transparent conductive film, respectively;
a plurality of light beam transmissive regions disposed on the first transparent substrate and the second transparent substrate;
light beam absorbing regions each disposed between light beam transmissive regions adjacent to each other and including light beam blocking electrophoretic particles and transmissive dispersion medium, the electrophoretic particles having charges of a specific polarity; and
a control circuit configured to control potential difference between the first transparent conductive film and the second transparent conductive film, and
the method comprising:
changing, by the control circuit, a dispersion state of the electrophoretic particles by adjusting the potential difference to change a range of outgoing direction of light beam that passes through the light beam transmissive regions and the dispersion medium;
applying, by the control circuit, a second voltage across the first electrode and the second electrode to change the range of outgoing direction to a wide range; and
keeping, by the control circuit, applying a first voltage lower than the second voltage to maintain the wide range of outgoing direction.

19. A driving method for a light beam direction control element,
the light beam direction control element including:
a first transparent substrate and a second transparent substrate disposed in such a manner that a main face of the first transparent substrate and a main face the second transparent substrate are opposed to each other;
a first transparent conductive film and a second transparent conductive film provided on the main face of the first transparent substrate and the main face of the second transparent substrate, respectively;
a first electrode and a second electrode electrically connected with the first transparent conductive film and the second transparent conductive film, respectively;
a plurality of light beam transmissive regions disposed on the first transparent substrate and the second transparent substrate;
light beam absorbing regions each disposed between light beam transmissive regions adjacent to each other and including light beam blocking electrophoretic particles and transmissive dispersion medium, the electrophoretic particles having charges of a specific polarity; and
a control circuit configured to control potential difference between the first transparent conductive film and the second transparent conductive film, and
the method comprising:
changing, by the control circuit, a dispersion state of the electrophoretic particles by adjusting the potential difference to change a range of outgoing direction of light beam that passes through the light beam transmissive regions and the dispersion medium;
applying, by the control circuit, a voltage across the first electrode and the second electrode to change the range of outgoing direction to a wide range; and electrically open-circuiting, by the control circuit, the first electrode and the second electrode after the applying the voltage across the first electrode and the second electrode to maintain the wide range of outgoing direction.

\* \* \* \* \*